(12) United States Patent
Lund

(10) Patent No.: US 8,333,171 B2
(45) Date of Patent: Dec. 18, 2012

(54) HOMOGENIZING FUEL ENHANCEMENT SYSTEM

(75) Inventor: Morten A. Lund, Vista, CA (US)

(73) Assignee: Exen Holdings, LLC, Escondido, CA (US)

( * ) Notice: Subject to any disclaimer, the term of this patent is extended or adjusted under 35 U.S.C. 154(b) by 358 days.

(21) Appl. No.: 12/702,252

(22) Filed: Feb. 8, 2010

(65) Prior Publication Data
US 2011/0023853 A1 Feb. 3, 2011

Related U.S. Application Data

(60) Provisional application No. 61/150,704, filed on Feb. 6, 2009.

(51) Int. Cl.
*F02B 43/00* (2006.01)
*F02B 13/00* (2006.01)
(52) U.S. Cl. ........ 123/1 A; 123/575
(58) Field of Classification Search ........ 123/1 A, 123/575
See application file for complete search history.

(56) References Cited

U.S. PATENT DOCUMENTS

| | | | |
|---|---|---|---|
| 2,693,351 A * | 11/1954 | Riley et al. ........ 261/119.1 |
| 2,758,579 A | 9/1956 | Pinotti | |
| 2,865,345 A | 12/1958 | Hilton | |
| 4,373,493 A | 2/1983 | Welsh | |
| 4,706,630 A | 11/1987 | Wineland et al. | |
| 4,742,801 A | 5/1988 | Kelgard | |
| 4,953,516 A | 9/1990 | Van Der Weide et al. | |
| 5,009,246 A * | 4/1991 | Giles ........ 137/205.5 |
| 5,140,959 A | 8/1992 | Durbin | |
| 5,206,711 A | 4/1993 | Berthold et al. | |
| 5,207,204 A | 5/1993 | Kawachi et al. | |
| 5,291,869 A | 3/1994 | Bennett | |
| 5,679,236 A | 10/1997 | Poschl | |
| 5,701,863 A | 12/1997 | Cemenska et al. | |
| 5,816,224 A | 10/1998 | Welsh et al. | |
| 5,864,995 A * | 2/1999 | Buch ........ 52/174 |
| 5,941,210 A | 8/1999 | Hill et al. | |
| 6,067,969 A | 5/2000 | Kemmler et al. | |
| 6,207,064 B1 * | 3/2001 | Gargas ........ 210/752 |
| 6,209,309 B1 | 4/2001 | McArthur | |
| 6,213,104 B1 | 4/2001 | Ishikiriyama et al. | |
| 6,235,067 B1 | 5/2001 | Ahern et al. | |
| 6,427,660 B1 | 8/2002 | Yang | |
| 6,513,505 B2 | 2/2003 | Watanabe et al. | |
| 6,571,748 B2 | 6/2003 | Holder et al. | |
| 6,584,780 B2 | 7/2003 | Hibino et al. | |
| 6,622,664 B2 | 9/2003 | Holder et al. | |

(Continued)

FOREIGN PATENT DOCUMENTS
KR 2004015645 2/2004
(Continued)

*Primary Examiner* — Noah Kamen
(74) *Attorney, Agent, or Firm* — Nath, Goldberg & Meyer; Gary M. Nath; Jerald L. Meyer

(57) ABSTRACT

A homogenizing fuel system involves at least one circulation loop existing outside of the injection system for continuously circulating and maintaining the homogeneity of a multi-fuel mixture apart from any demands by or delivery to the engine's injection system (whether a direct injection fuel gallery or a common rail), and at least one infusion tube configured within the at least one circulation loop for providing a volumetric expansion wherein the fuel mixture is able to slow and more sufficiently mix and thereby become relatively more homogeneous.

19 Claims, 8 Drawing Sheets

U.S. PATENT DOCUMENTS

| | | |
|---|---|---|
| 6,626,158 B2 | 9/2003 | Algeri |
| 6,761,325 B2 | 7/2004 | Baker et al. |
| 6,830,239 B1 * | 12/2004 | Weber et al. ............... 261/121.1 |
| 6,845,608 B2 | 1/2005 | Klenk et al. |
| 7,019,626 B1 | 3/2006 | Funk |
| 7,028,672 B2 | 4/2006 | Glenz et al. |
| 7,055,511 B2 | 6/2006 | Glenz et al. |
| 2002/0062822 A1 | 5/2002 | Watanabe et al. |
| 2002/0152999 A1 | 10/2002 | Holder et al. |
| 2007/0169749 A1 | 7/2007 | Hoenig et al. |
| 2008/0022965 A1 | 1/2008 | Bysveen et al. |
| 2008/0029066 A1 | 2/2008 | Futonagane et al. |
| 2008/0245318 A1 | 10/2008 | Kuroki et al. |

FOREIGN PATENT DOCUMENTS

| | | |
|---|---|---|
| WO | 2007062217 | 5/2007 |
| WO | 2008036999 | 3/2008 |
| WO | 2008141390 | 11/2008 |

* cited by examiner

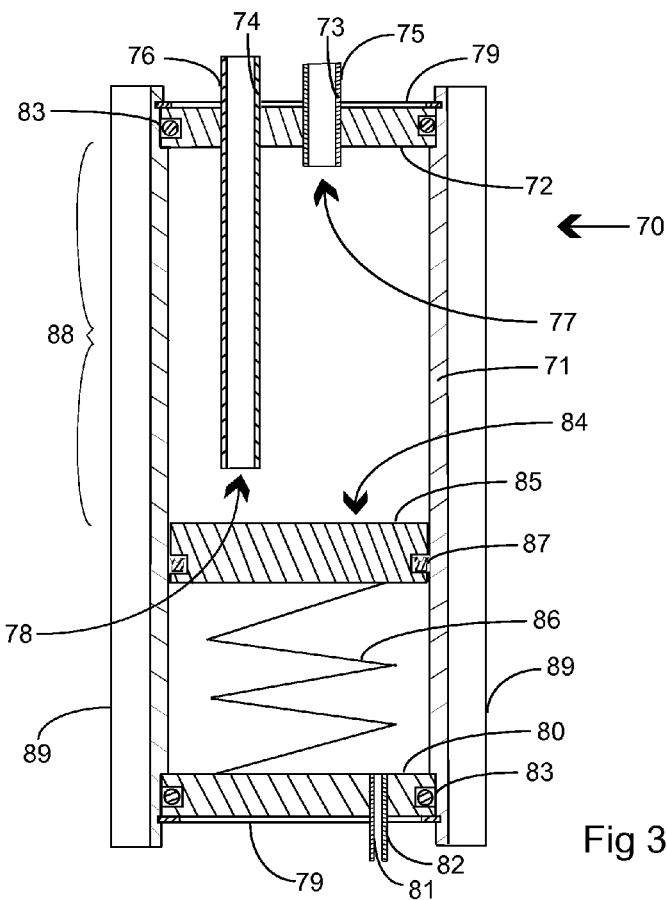
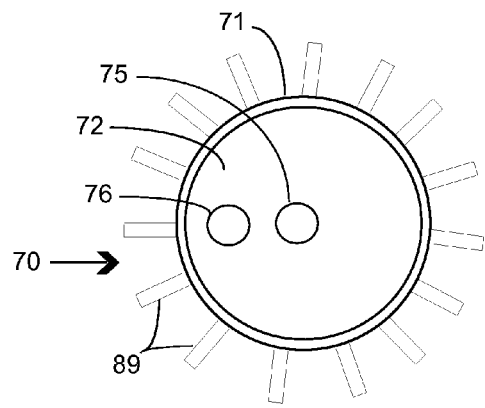
Fig 4
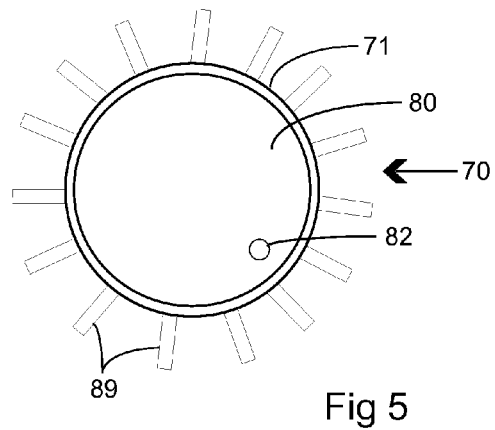
Fig 5

HOMOGENIZING FUEL ENHANCEMENT SYSTEM

RELATED APPLICATIONS

This application claims priority and is entitled to the filing date of U.S. Provisional application Ser. No. 61/150,704 filed Feb. 6, 2009, and entitled "Homogenizing Fuel Enhancement System." The contents of the aforementioned application are incorporated by reference herein.

INCORPORATION BY REFERENCE

Applicant(s) hereby incorporate herein by reference any and all U.S. patents and U.S. patent applications cited or referred to in this application. Specifically, Applicant hereby incorporates herein by reference the entire contents of International patent application Ser. No. PCT/US2006/045399 filed on Nov. 24, 2006, and entitled "A Multi Fuel Co Injection System for Internal Combustion and Turbine Engines," and U.S. provisional patent application Ser. No. 61/055,965 filed on May 23, 2008, and Ser. No. 61/057,199 filed on May 29, 2008, both entitled "Multi-Fuel Co-Injection System and Method of Use." Accordingly, it is to be understood that any of the embodiments or features disclosed in the incorporated applications or their equivalents may be substituted for or employed in connection with those exemplary embodiments disclosed in the present application, in whole or in part, without departing from the spirit or scope of the invention.

BACKGROUND OF THE INVENTION

1. Field of the Invention

Aspects of this invention relate generally to fuel systems, and more particularly to enhanced fuel systems operating with multi-fuel mixtures.

2. Description of Related Art

The following art defines the present state of this field:

By way of background, efforts over the past several decades abound directed to various means by which the efficiency of internal combustion engines may be improved or the emissions of such engines reduced. Some of these efforts have focused on the actual engine design, and particularly the fuel delivery, injection, and combustion systems and processes, while other efforts have been directed to improvements to the fuels themselves to somehow increase their combustion effect or the efficiency and uniformity with which they burn and hence the power derived therefrom and/or the reduced emissions resulting from a "cleaner" combustion process. The present application is primarily concerned with the former category of improvements to the fuel system itself, there being presented herein a number of new and improved homogenizing fuel systems and system components, the benefits of which will be readily apparent.

As to the prior art, in sum, all known efforts to increase the efficiency of internal combustion engines have to date led to only marginal success at best. Most such "improvements" have resulted in only a slight increase in actual efficiency and/or were achieved using approaches that are technologically or practically not workable, as either involving fuels that are not readily available or safely used or systems and hardware that add tremendous cost and complexity to the engine. As an example, currently much work is being done in the art in connection with homogenous charge compression ignition ("HCCI"). In ideal "laboratory-type" usage, efficiency gains on the order of thirty percent (30%) are being seen in gasoline internal combustion engines using HCCI. However, due to the sensitive nature of this approach to combustion and its requirement of precise temperature and pressure conditions (compression ratios) in the combustion chambers for the automatic combustion reaction to be set off, under actual road testing where an engine is subjected to various loading demands, the HCCI process breaks down, leading not only to little to no efficiency gains but in some cases to engine failures (predetonation).

Other attempts to improve the efficiency and/or reduce emissions of internal combustion engines have included fuel fractioning, additives in the air intake, which thus don't interact with the fuel until they meet in the combustion chamber, and actual fuel additives or formulations introduced into the combustion chamber in some fashion that for a variety of reasons are relatively less effective given the particular system or implementation method.

First, as to the prior art fuel fractioning approach, generally, a number of references teach on-board fractioning, or separating a fuel into light and heavy distillates, for example, or otherwise conditioning a fuel for varied use depending on the demands of the engine, such as at start-up versus idle versus high RPM's, high or low load, or "warmed" operation. U.S. Pat. No. 2,758,579 to Pinotti and U.S. Pat. No. 2,865,345 to Hilton, commonly assigned and dating to the 1950's, teach systems wherein a liquid residual fuel and a liquid distillate fuel are proportionately mixed and delivered through mechanical metering to the engine. In terms of mixing the fuel fractions, Hilton teaches an "orifice mixer 32," which is generally defined in the art as an "arrangement in which two or more liquids are pumped through an orifice constriction to cause turbulence and consequent mixing action," while Pinotti teaches passage of the fuel fractions through a proportioning valve 5 and then on to the closed loop injection circulating system where the mixture is maintained "in an agitated or turbulent condition through header 23 against the back pressure of relief valve 25." Both Pinotti and Hilton further involve residual and/or distillate fuel heaters to adjust through heat the viscosity of one or more of the fuel fractions to facilitate processing of the fuel mixtures, particularly during cold starting.

More recently, U.S. Pat. No. 6,067,969 to Kemmler et al. teaches a fuel supply system for an internal combustion engine with a fuel tank for liquid fuel, from which a fuel supply line leads to a fuel injection device, and an evaporating and condensing device for low-boiling fuel components also connected to the fuel tank. Also provided is an intermediary condensate tank connected downstream from the evaporating and condensing device, from which tank a condensate line leads to a control valve that regulates supply to the injection device. A residual fuel line for the high-boiling fuel produced in the evaporating and condensing device ends in an additional tank, from which a residual fuel supply line runs to a reversing valve mounted in the fuel supply line. The reversing valve is controlled so that the high-boiling fuel is supplied from the residual fuel supply line into the fuel supply line going to an injection device of the engine. Kemmler states that "[u]sing shuttle valve 3 and reversing valve 6, it can be ensured that the engine is supplied with the best possible fuel components for optimum operation by selectively feeding it with fuel, i.e., original fuel, low-boiling fuel from condensate line 15, or high-octane residual fuel from residual fuel line 22."

Similarly, U.S. Pat. Nos. 6,571,748 and 6,622,664 to Holder et al. teach a fuel fractioning system as part of a fuel supply system for an internal combustion engine having a fuel tank for liquid fuel, a fuel pump that draws fuel from the fuel tank and pressurizes the fuel to an injection pressure at which the fuel is made available to the internal combustion engine, a fuel-fractionating device, which is preferably in the form of an evaporator or evaporation chamber and that produces at least one liquid fuel fraction from the fuel, and an accumulator that receives the liquid fuel fraction from the fuel-fractionating device, stores it, and makes it available to the internal combustion engine, the fuel and fuel fraction being fed to the internal combustion engine by the fuel supply system as a function of demand, with the accumulator being a pressure accumulator and including a pressure-generating means for pressurizing the fuel fraction in the pressure accumulator up to the injection pressure. In a further embodiment, the fuel and the fractions are mixed in a mixing chamber according to a performance graph stored in a control unit depending on the operating state of the engine and the mixture is then supplied to the engine in a controlled manner. Holder states in the '664 patent that "[a]s far as the inventive concept is concerned it is unimportant whether the fuel fractions are present in gaseous or liquid form," yet it is also stated that "the fuel mixture [is injected] into the individual combustion chambers of the internal combustion engine in the conventional manner," such that Holder effectively does not teach or enable injection of a liquid-gaseous fuel mixture. Rather, Holder discloses a fuel system that splits a liquid fuel into at least two fractions on board, such as a relatively high and relatively low boiling point fraction as through vacuum evaporation, which fractions are then mixed in a manner or ratio that "is optimal for the momentary engine operating state," such that a dynamic or continuously variable fuel mix is required in the invention, much like Kemmler in this respect. Holder's primary objective appears to be emissions control.

And even more recently in connection with fuel fractioning systems, U.S. Pat. Nos. 7,028,672 and 7,055,511 to Glenz et al. teach a fuel supply system for an internal combustion engine having two separate storage containers for liquid fuels, both connected to a first controllable valve that is connected, via a connecting line including a fuel pump, to an inlet of a second controllable valve having two outlets in communication by separate fuel lines with a fuel injection nozzle of the internal combustion engine, each of the two separate fuel lines including a fuel pressure regulator, one being in communication with one and the other with the other of the two separate fuel storage containers for returning excess fuel to the fuel storage container from which fuel is being supplied to the fuel injection nozzle. Specifically, the Glenz systems are directed to delivering alternating liquid fuels to one injector of the engine at a time as derived from a fuel fractionation unit and pushed into the injectors as by compressed air or other gas, which is a similar approach to the well-known original Rudolph Diesel injection practice. Like Holder, the focus of Glenz is also emissions reduction, with specific emphasis on the start-up or warm-up phases of engine operation, and particularly on the on-board mixing and controlled use of optimized "starting" and "main" fuel mixtures as produced by the fuel fractionation unit.

Regarding prior art fuel fractioning systems, then, it will be appreciated that there is taught only liquid fuel or fuel fraction co-mixtures that are then introduced to the engine's fuel injection system typically in a controlled, variable manner to adjust to the demands of the engine while still reducing emissions, such as when cold starting and the like, without any teaching or suggestion that a circulation loop and/or volumetric expansion device would exist outside the fuel injection system as part of the overall fuel delivery system of the engine wherein co-mixtures of liquid and gaseous fuels would be sufficiently mixed and maintained in such a substantially homogeneous state of mixture until being delivered to the engine's fuel injection system for better atomization of the fuel mixture upon injection and thus more efficient combustion.

Turning to the introduction of a fuel additive such as propane or hydrogen through the air intake rather than in the fuel stream, there are known in the art a number of approaches whereby such an additive enters the combustion chamber as part of the air flow. For example, U.S. Pat. No. 7,019,626 to Funk teaches systems, methods and apparatuses of converting an engine into a multi-fuel engine in which some of the combusted gasoline or diesel fuel is replaced in the combustion chamber by the presence of a second fuel such as natural gas, propane, or hydrogen introduced through the air intake or separately directly into the combustion chamber. The Funk system includes a control unit for metering the second fuel and a passenger compartment indicator that indicates how much second fuel is being combusted relative to the diesel or gasoline. Funk indicates that the purpose of the invention is to address the emissions shortcomings of diesel engines and states that the various embodiments disclosed reduce particulate emissions while providing "an inexpensive diesel or gasoline engine conversion method and apparatus that informs the operator of the amount of alternative fuel that is being combusted."

In Korean Patent Application Publication No. KR 2004/015645A, Bai teaches that liquid and gaseous fuels are mixed and then immediately passed into the combustion chamber through the air intake. Specifically, Bai discloses a jet mixer 1 comprising a gas and liquid fuel mixing pipe 15 arranged at the ends of a gas fuel supply pipe 11 and a liquid fuel supply pipe 13 so as to mix the fuels supplied from the supply pipes, wherein the gas and liquid fuel mixing pipe 15 has outlet holes and a fuel filter 17 is spaced from the mixing pipe 15 to filter off large particles from the mixed fuel, which then passes through a mixed fuel supply pipe 19 to the engine.

Clearly, in any such case where a fuel additive is introduced into the combustion chamber by way of the air intake, or even by being injected separately from the primary liquid fuel, more about which is said below in connection with further prior art examples, there is provided no means by which the primary and secondary fuels, or liquid and gaseous fuels, are able to sufficiently mix together prior to the injection and combustion events.

Turning now to the introduction of a fuel additive such as propane or hydrogen in the fuel stream, specifically, U.S. Pat. No. 6,845,608 to Klenk et al. teaches a method for operating an internal combustion engine in which at least two different fuels are simultaneously supplied to at least one combustion chamber of the internal combustion engine. More specifically, Klenk discloses the injection of hydrogen along with diesel fuel through a common injector primarily for the purpose of emissions reduction, just as for most of the "fuel fractioning" prior art discussed above. Similarly, U.S. Pat. No. 6,427,660 to Yang teaches a compression ignition internal combustion engine 7 with at least one combustion chamber 10 having an air inlet 14 and an exhaust outlet 26 with a dual fuel injector being provided having a mixing chamber 46 with an outlet fluidly connected with the combustion chamber 10 via a first valve 54. A liquid fuel line 64 is provided for delivering liquid fuel to the mixing chamber 46. The liquid fuel line 64 is connected to the mixing chamber 46 via a second valve 60. A combustible gas line 56 is provided for delivering compressed combustible gas to the mixing chamber 46. Upon an opening of the first valve 54, the liquid fuel is brought into the combustion chamber 10 by the compressed combustible gas. It is thus clear from such prior art that there is shown only liquid and gaseous fuels essentially being co-injected without any means for sufficiently mixing the additive and the base fuel prior to injection.

Other approaches in the art of bringing together multiple fuels as a common stream even ahead of injection yet involve further disadvantageous features and still without providing a desirable means to substantially homogenously mix particularly liquid and gaseous fuels and maintain such homogeneity prior to injection. For example, U.S. Pat. No. 6,513,505 to Watanabe et al. teaches injectors 2 that are connected to a common rail 4 via respective dispensing conduits 3 and a mixture of a liquid fuel fed from a liquid fuel tank 2 and an additional fluid fed from an additional fluid tank 9 that is then fed to the common rail 4. The additional fluid contained in the mixture is turned to its supercritical state, and the mixture is injected from the injectors 2 to the engine. The inlets of the dispensing conduits 3 are positioned, with respect to the common rail 4, to open out into a liquid fuel layer which will be formed in the common rail 4 when a separation of the mixture occurs. Thus, while teaching that the fuel components, such as diesel or light oil and an additive such as water, carbon dioxide, hydrogen, and hydrocarbon such as alcohol, methane and ethane, can even be mixed upstream of the fuel injection system, here in a choke 12 in line ahead of the injection pump 6, Watanabe further discloses only that the additional fluid be at all times kept in its supercritical state, which is generally defined as being at a temperature and pressure above its thermodynamic critical point, or having characteristics of both a liquid and a gas. To maintain such a supercritical state of the fuel additive, Watanabe teaches maintaining the temperature "lower than the critical temperature $T_c$ of the additional fluid" and the pressure "higher than the vaporizing (liquefying) pressure of the additional fluid" in the fuel line all the way from the additive tank 9 to the pressurizing pump 6. To do so introduces a number of complexities and attendant costs to the Watanabe system. Moreover, maintaining and dealing with these finely balanced physical fuel properties presents further challenges within the injection system, and the common rail 4, specifically. The vertically oriented common rail 4 in Watanabe is expressly configured not only to maintain specific temperatures and pressures but also to allow, as when the engine is off, for separation of the additional fluid, namely the gaseous fuel such as natural gas or methane, from the primary liquid fuel such as diesel, with the diesel occupying the bottom space of the common rail so as to be injected first until the common rail warms up, the additional fluid returns to its supercritical state, and the two fuel components then re-mix to some extent until "finally the two layers in the common rail 4 would disappear." Therefore, it is clear that Watanabe introduces relatively costly and complex features in its "fuel feeding device" in an effort to maintain the additional fluid in a supercritical or liquid state, which Watanabe indicates is necessary to achieve sufficient mixing with the primary fuel, even expressly teaching that "if the additional fluid vaporizes before it is mixed with the liquid fuel, or before it is turned to its supercritical state even after it is mixed with the liquid fuel, the liquid fuel and the additional fluid cannot mix with each other uniformly." Watanabe goes on to say that "[i]f the additional fluid vaporizes, the volume thereof increases. Therefore, it is difficult to feed the additional fluid sufficiently." Thus, Watanabe clearly teaches that the fuel constituents must be kept in a liquid or supercritical state essentially throughout the system while in operation using temperature and pressure in order to adequately mix and later inject the liquid fuel mixture.

Similarly, and in yet another category of prior art multi-fuel systems, there is taught a reverse approach where the gaseous fuel component such as propane becomes the primary combustible fuel and the liquid fuel such as diesel is a secondary ignition or combustion catalyst. For example, International Publication No. WO 2008/141390 to Martin discloses an injection system for a high vapor pressure liquid fuel such as liquefied petroleum gas (i.e., LPG or propane) that "keeps the fuel liquid at all expected operating temperatures" by use of a high pressure pump capable of at least 2.5 MPa pressures. The fuel can be injected directly into the cylinder or into the inlet manifold of an engine via axial or bottom feed injectors and also could be mixed with a low vapor pressure fuel (e.g. diesel) to be injected similarly. The fuel, mixed or unmixed, can be stored in an accumulator under high pressure assisting in keeping the engine running during fuel changeovers and injection after a period of time as in re-starting the engine. The same injectors can be used to inject any of the fuels or mixtures of them. Therefore, like Watanabe and others, Martin also teaches the desirability of maintaining all fuel constituents at all times as liquids to facilitate mixing and other processing of the fuel before and during injection.

In U.S. Patent Application Publication No. US 2008/0022965 to Bysveen et al., there is taught a compression ignition internal combustion engine that operates using a methane-based fuel and again diesel or the like as an "ignition initiator." The fuel and method of operating the engine can be employed in a range of applications such as, for example, road or marine vehicles or in static applications such as electrical generators. Just as with Watanabe and Miller, Bysveen teaches that the "[g]as fuel is pressurized or liquefied and mixed with [the diesel fuel]," here off-board of the engine or vehicle, and then "[t]he pre-mixed fuel 3 is fed into a storage vessel 4 which maintains the fuel in a pressurized or liquid state." In an alternative embodiment of Bysveen, "the injector 206 is arranged to receive the two fuel components and to introduce them simultaneously into the combustion chamber." Here, much like Klenk, for example, "[t]he two components are mixed in the injector immediately before injection into [the] combustion chamber ensuring a uniform dispersion of ignition initiator in the pressurized or liquefied gas." Accordingly, there is no fuel re-pressurization in Bysveen, Klenk and other such systems, whereby only common rail rather than direct or mechanical injection may be employed, otherwise there may be pump cavitations, and, in the case of Bysveen, additional hardware in the form of specifically-engineered hydraulic injectors is still needed to insure that the liquid-gaseous fuel mixture is adequately injected (that is, that excess vapor formation that could lead to vapor lock is mitigated). Also like Klenk, Holder and others, Bysveen's primary aim is again emissions reduction rather than improved fuel efficiency.

Referring briefly to one further PCT patent application, analogous to Bysveen, International Publication No. WO 2008/036999 to Fisher teaches a dual fuel system and assembly where liquid LPG and diesel are mixed and then distributed via the common rail to the combustion chambers. With the preferred embodiment of the dual fuel system, Fisher asserts that only minor changes are required to the diesel engine without altering the manufacturers' specifications. According to Fisher, the resultant combustion of the liquid fuel mixture provides cleaner emissions and relatively cheaper vehicle operational costs due to essentially the use of a less expensive fuel, not a result of greater efficiency. In a bit more detail, Fisher teaches passive mixing of pre-pressurized liquid diesel and liquid propane in a mixing chamber 28 configured as a spherical reservoir with the respective fuel streams being introduced off-axis one to the other to create a swirling effect and thereby being "adapted to mix a proportioned flow of the liquefied gas and a proportioned flow of diesel to form a liquid fuel mixture." A wire mesh 61 is placed in the mixing chamber 28 "to facilitate mixing of the fuels" or agitation. Fisher teaches that the liquid fuel mixture is "preferably pumped to a common rail under high pressure so that the liquid fuel mixture remains in a liquid state." It follows that just as for Watanabe, Bysveen, Miller and others, Fisher also teaches that the liquid and gaseous fuels are to be in liquid state, as by being under sufficient pressure, at all points in the mixing and delivery process within the disclosed dual-fuel system. And as with others, Fisher would appear to again be only concerned with emissions reduction.

Thus, the prior art as summarized above includes various systems by which primarily diesel engines can be converted to operate in a "dual-fuel" or "multi-fuel" mode by fractioning the liquid fuel (Hilton, Pinotti, Kemmler, Holder, and Glenz), by adding another fuel constituent to the fuel stream (Klenk, Yang and Watanabe) or the air intake (Funk and Bai), or by effectively reversing the fuels and injecting a small amount of diesel into the combustion chamber as a catalyst or, in the words of Bysveen, an "ignition initiator," sometimes known as a "pilot injection," which ignites or combusts an alternative fuel such as natural gas, propane or hydrogen that was introduced into the combustion chamber through the air intake or directly into the chamber separately from or mixed under pressure with the diesel (Martin, Bysveen and Fisher). Certainly, in any such manner, a percentage of the diesel is replaced by such alternative fuels in the combustion event, resulting in lower exhaust emissions, especially particulate matter. This may also reduce fuel costs if the alternative fuels are cheaper than diesel, though not necessarily reducing overall fuel consumption or actually improving fuel efficiency. Some of the more recent approaches to multi-fuel injection as highlighted above do go so far as to suggest that such alternative fuels be mixed with the diesel fuel at some point upstream, prior to the injection event, but these other references teach that diesel remains a secondary fuel or "ignition initiator" in a small proportion relative to the alternative fuel and/or that specific physical states of the fuel components, such as supercritical or liquefied through sufficiently high pressures, be maintained at all times in order for the fuels to be satisfactorily mixed and co-injected (see Watanabe and also Ishikiriyama and Hibino below), or otherwise provide no teaching or structure for substantially homogenously mixing the fuels prior to injection so as to improve the atomizing effect on the diesel or other primary fuel component of the mixture by the uniform dispersion therethrough of the gaseous, or lower boiling point, fuel component.

Other prior art generally relating to the field of efficiency and/or emissions improvement in internal combustion engines includes the following:

U.S. Pat. No. 4,373,493 to Welsh teaches a method and apparatus for utilizing both a liquid fuel and a gaseous fuel with a minimum change in a standard internal combustion engine. The gaseous and liquid fuels are fed from separate fuel supplies with the flow of fuels being controlled in response to engine load so that at engine idle only gaseous fuel is supplied and combusted by the engine and both gaseous and liquid fuels are supplied and combusted when the engine is operating under load conditions.

U.S. Pat. No. 4,953,516 to van der Weide teaches a device for the intelligent control of a venturi-type carburetor unit for a gaseous fuel, including a pressure regulator, a main throttle valve in the air suction pipe for control of the engine output and a regulating valve in the gas supply pipe between the pressure regulator and the venturi, this valve being coupled to the main throttle valve. By adjusting this mechanical system for providing a too rich air-fuel-mixture under all conditions, only mirror adjustments of the mixture are necessary to provide the engine with the correct mixture required for each load/speed condition. These requirements are stored in a processor, and the latter controls the necessary corrections of the mixture by diluting the gas flow to the main venturi with some air. To this end a small venturi is placed in the gas pipe, the gas flow sucking the diluting air through a mixing air regulating valve, which valve is controlled by the processor in a continuous, analogic intelligent way. Optionally an $O_2$-sensor placed in the exhaust gases may send feed-back signals to the processor.

U.S. Pat. No. 5,207,204 to Kawachi et al. teaches an engine having a combustion chamber and a fuel injection valve for directly injecting a fuel into the combustion chamber. An assist air supplying apparatus supplies assist air to atomize the fuel injected by the fuel injection valve. Assist air supply pressure is controlled so that a given pressure difference is secured between the assist air supply pressure and pressure in the combustion chamber. The assist air, therefore, is supplied under proper pressure for an entire period of fuel injection, to adequately micronize the injected fuel and improve combustion efficiency.

U.S. Pat. No. 5,291,869 to Bennett teaches a fuel supply system for providing liquified petroleum gas ("LPG") fuel in a liquid state to the intake manifold of an internal combustion engine, including a fuel supply assembly and a fuel injecting mechanism. The fuel supply assembly includes a fuel rail assembly containing both supply and return channels. The fuel injecting mechanism is in fluid communication with the supply and return channels of the fuel rail assembly. Injected LPG is maintained liquid through refrigeration both along the fuel rail assembly and within the fuel injecting mechanism. Return fuel in both the fuel rail assembly and the fuel injecting mechanism is used to effectively cool the supply fuel to a liquid state prior to injection into the intake manifold of the engine.

U.S. Pat. No. 5,816,224 to Welsh et al. teaches a system for storing, handling, and controlling the delivery of a gaseous fuel to internal combustion engine powered devices adapted to run simultaneously on both a liquid fuel and a gaseous fuel. The invention provides a control system having a float controlled solenoid for ensuring that a consistent supply of dry gas is delivered to the engine. The invention uses the sensors and computer of the existing electronic fuel delivery system of the device to adjust the amount of liquid fuel delivery to compensate for the amount of gaseous fuel injection. The invention provides a gaseous fuel control system for a dual fuel device which is integrated and compact, and which preferably includes a fuel fill connection for the gaseous fuel. The invention also provides a horizontal fuel reservoir comprised of end interconnected parallel conduits and, preferably, includes two separate compartments and a pressure relief system for permitting expansion into a relief compartment from a main compartment. It also provides horizontal and vertical interchangeable reservoirs with expansion properties filled by weight.

U.S. Pat. No. 6,213,104 to Ishikiriyama teaches that the state of a liquid fuel such as diesel fuel is made a supercritical state by raising the pressure and the temperature of the fuel above the critical pressure and temperature. Then, the fuel is injected from the fuel injection valve into the combustion chamber of the engine in the supercritical state. When the fuel in the supercritical state is injected into the combustion chamber of the engine, it forms an extremely fine uniform mist in the entire combustion chamber. Therefore, the combustion in the engine is largely improved.

U.S. Pat. No. 6,235,067 to Ahern et al. teaches a scheme for combusting a hydrocarbon fuel to generate and extract enhanced translational energy. In the scheme, hydrocarbon fuel is nanopartitioned into nanometric fuel regions each having a diameter less than about 1,000 angstroms; and either before or after the nanopartitioning, the fuel is introduced into a combustion chamber. In the combustion chamber, a shock wave excitation of at least about 50,000 psi and with an excitation rise time of less than about 100 nanoseconds is applied to the fuel. A fuel partitioned into such nanometric quantum confinement regions enables a quantum mechanical condition in which translational energy modes of the fuel are amplified, whereby the average energy of the translational energy mode levels is higher than it would be for a macro-sized, unpartitioned fuel. Combustion of such a nanopartitioned fuel provides enhanced translational energy extraction by way of, e.g., a reciprocating piston because only the translational energy mode of combustion products appreciably contributes to momentum exchange with the piston. The shock wave excitation provided by the invention, as applied to combustion of any fuel, and preferably to a nanopartitioned fuel, enhances translational energy extraction and exchange during combustion by enhancing translational energy mode amplification in the fuel and by enhancing transfer of an appreciable amount of energy from that translational mode to the piston before the combusted fuel re-equilibrates the translational energy into other energy modes.

U.S. Pat. No. 6,584,780 to Hibino et al. teaches a system that stores densely dissolved methane-base gas and supplies gas of a predetermined composition. A container 10 stores methane-base gas dissolved in hydrocarbon solvent and supplies it to means for adjusting the composition, through which an object of regulated contents is obtained. Preferably, the means for adjusting the composition is means for maintaining the tank in a supercritical state, or piping 48 for extracting substances at a predetermined ratio from the gas phase 12 and liquid phase 16 in the container.

U.S. Pat. No. 6,761,325 to Baker et al. teaches a dual fuel injection valve that separately and independently injects two different fuels into a combustion chamber of an internal combustion engine. A first fuel is delivered to the injection valve at injection pressure and a second fuel is either raised to injection pressure by an intensifier provided within the injection valve, or delivered to the injection valve at injection pressure. Electronically controlled valves control hydraulic pressure in control chambers disposed within the injection valve. The pressure of the hydraulic fluid in these control chambers is employed to independently actuate a hollow outer needle that controls the injection of the first fuel. Disposed within the outer needle is an inner needle that controls the injection of the second fuel. The outer needle closes against a seat associated with the injection valve body and the inner needle closes against a seat associated with the outer needle.

U.S. Patent Application Publication No. US 2007/0169749 to Hoenig et al. teaches a fuel-injection system for injection of fuel into an internal combustion engine that includes at least one fuel injector and a first fuel-distributor line which is connected to the at least one fuel injector. A second fuel-distributor line is provided which is connected to the at least one fuel injector via an individual corresponding lance.

U.S. Patent Application Publication No. US 2008/0029066 to Futonagane et al. teaches a fuel injector (1) in an internal combustion engine, wherein an intermediate chamber control valve (26) operated by the fuel pressure in a common rail (2) is arranged in a fuel flow passage (25) connecting a two-position switching type three-way valve (8) and an intermediate chamber (20) of a booster piston (17). When the fuel pressure in the common rail (2) is in a high pressure side fuel region, the booster piston (17) is operated by this intermediate chamber control valve (26), while when the fuel pressure in the common rail (2) is in a low pressure side fuel region, the operation of the booster piston (17) is stopped by this intermediate chamber control valve (26).

What is still needed and has been heretofore unavailable is a relatively simple and cost-effective engine fuel enhancement system through which efficiency gains on the order of thirty to one hundred percent (30-100%) or more can be achieved. The present invention meets this need and provides further related advantages as described below.

SUMMARY OF THE INVENTION

Aspects of the present invention teach certain benefits in construction and use which give rise to the exemplary advantages described below.

By way of overview, aspects of the invention relate to a homogenizing fuel enhancement system involving at least one circulation loop existing outside of the injection system for continuously circulating and maintaining the homogeneity of a multi-fuel mixture apart from any demands by or delivery to the engine's injection system (whether a direct injection fuel gallery or a common rail), and at least one infusion tube configured within the at least one circulation loop for providing a volumetric expansion wherein the fuel mixture is able to slow and more sufficiently mix and thereby become relatively more homogeneous. Other variations on these two components are possible without departing from the spirit and scope of the present invention. Moreover, additional components may be interchangeably incorporated in any such homogenizing fuel enhancement system for added or ancillary functionality, such as an accumulator to account for pressure surges, a fuel cooling means, and a control system for controlling, among other things, the on-board mixing and delivery of mixed fuel to the engine.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings:

FIG. 3 is an enlarged side schematic of an exemplary homogenizing fuel apparatus according to aspects of the invention;

FIG. 4 is a top schematic thereof;

FIG. 5 is a bottom schematic thereof;

DETAILED DESCRIPTION OF THE INVENTION

The above described drawing figures illustrate aspects of the invention in at least one of its exemplary embodiments, which are further defined in detail in the following description.

The subject of this patent application is an improved fuel enhancement system in various embodiments for use in connection with internal combustion engines or the like that builds on the disclosures of the above-referenced applications. Thus, while the further exemplary embodiments shown and described herein are focused on specific aspects of particularly the fuel enhancement system components relating to the mixing, circulation, and delivery of the multi-fuel mixture, here specifically in the context of common rail or mechanical injection diesel engines, it will be appreciated by those skilled in the art that the present invention is applicable to and may work in conjunction with a variety of engines, engine fuel systems, and fuels now known or later developed or discovered and so is not limited to the particular embodiments shown and described. Furthermore, it is to be understood that the word "fuel" as used throughout the present application and the referenced prior applications encompasses any combustible substance or any substance that aids in, enhances or otherwise affects combustion in some way. Moreover, a "gaseous fuel" is to be understood as any such "fuel" substance that is in a gaseous state at atmospheric conditions, or at atmospheric pressure and zero degrees Celsius, such as air or propane, irrespective of the phases or states such a gaseous fuel may move through or be in at any particular point in an engine's fuel delivery system, injector, or combustion chamber, generally, or in the instant improved fuel enhancement system, as will be appreciated from the more detailed explanation of aspects of the present invention set forth further below.

Generally, aspects of the present homogenizing fuel system involve at least one circulation loop existing outside of the injection system for continuously circulating and maintaining the homogeneity of a multi-fuel mixture apart from any demands by or delivery to the engine's injection system (whether a direct injection fuel gallery or a common rail), and at least one infusion tube configured within the at least one circulation loop for providing a volumetric expansion wherein the fuel mixture is able to slow and more sufficiently mix and thereby become relatively more homogeneous. Other variations on these two components are possible without departing from the spirit and scope of the present invention. Moreover, additional components may be interchangeably incorporated in any such homogenizing fuel system for added or ancillary functionality, such as an accumulator to account for pressure surges, a fuel cooling means, and a control system for controlling, among other things, the onboard mixing and delivery of mixed fuel to the engine.

Figure 1:
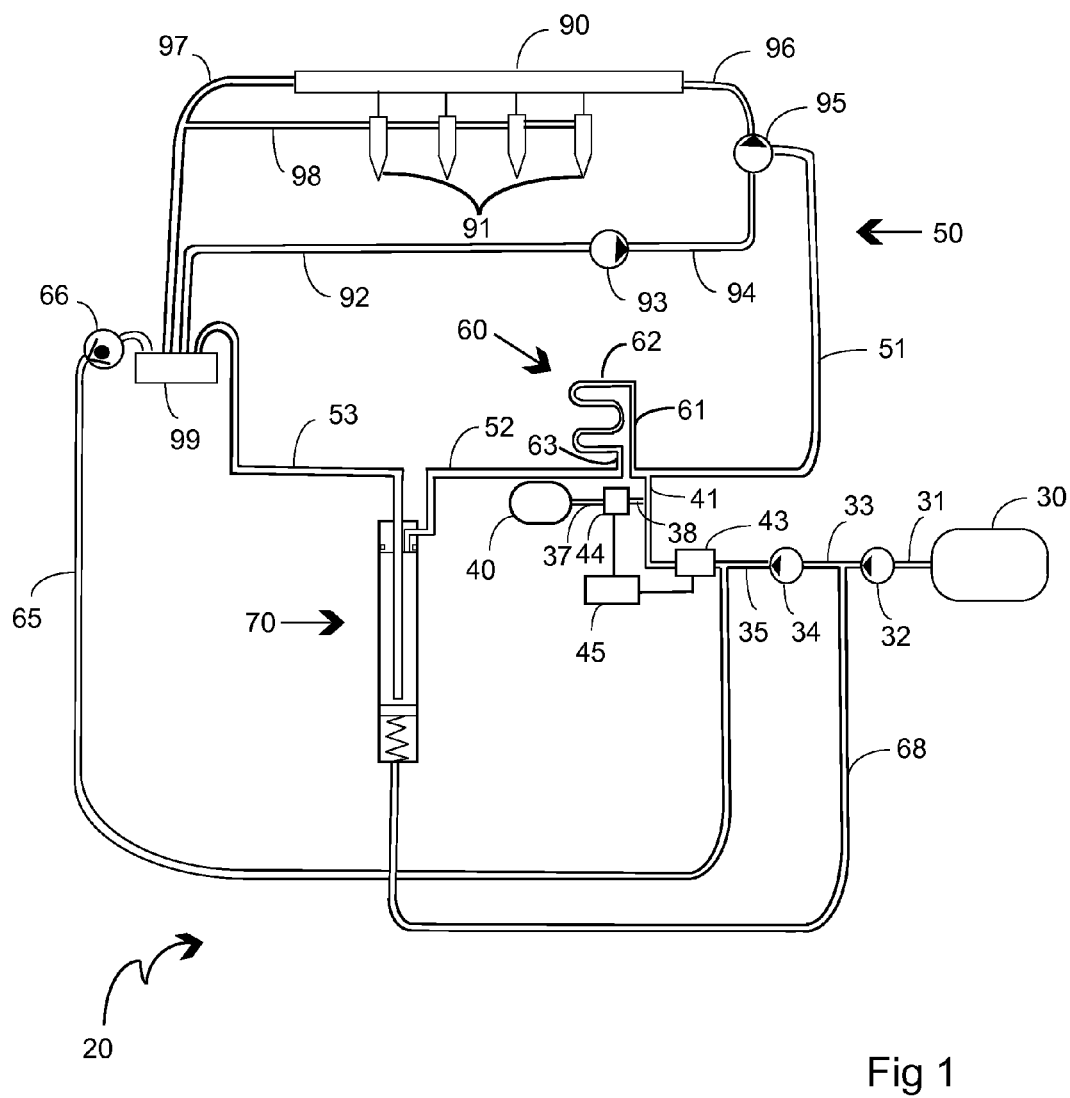
FIG. 1 is a schematic of an exemplary embodiment of the invention.
Figure 2:
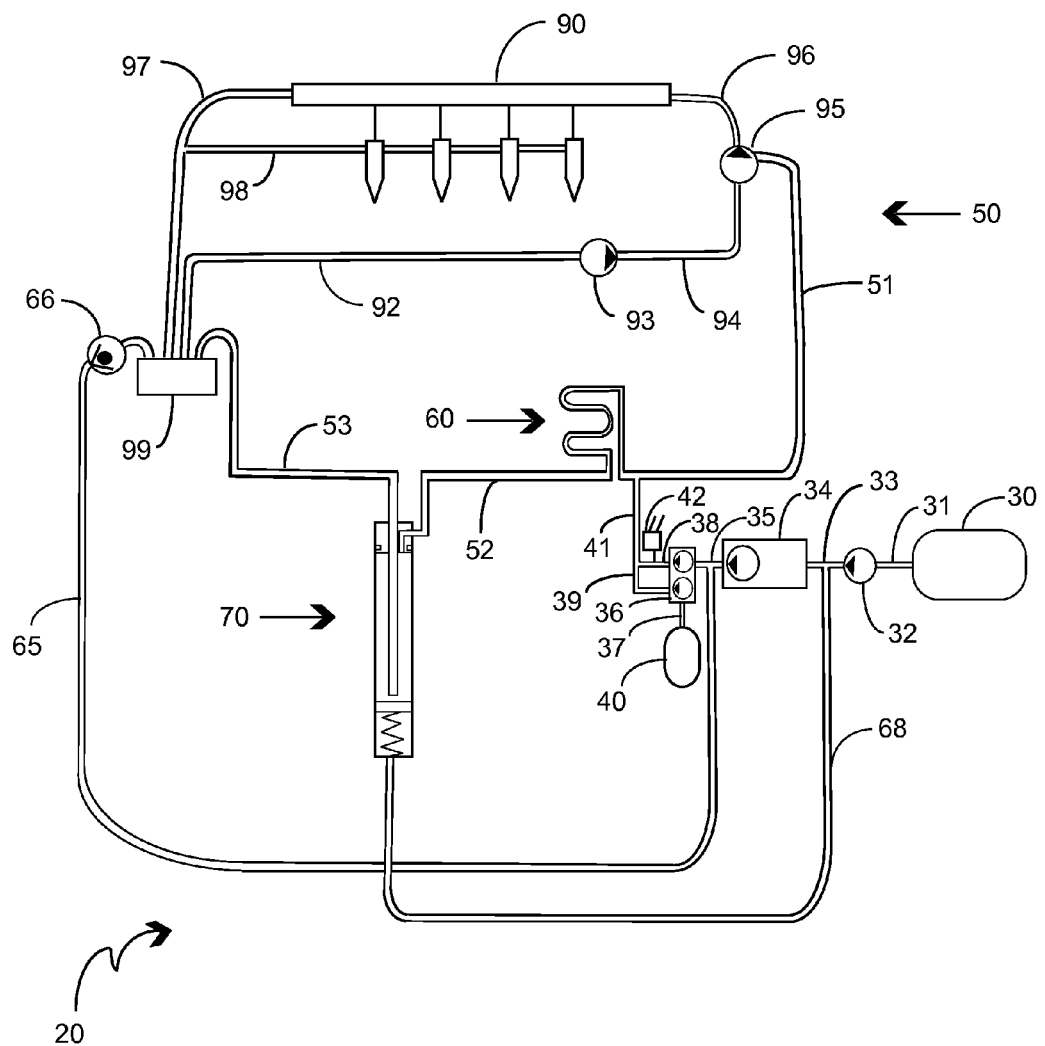
FIG. 2 is a schematic of an alternative exemplary embodiment of the invention.

Referring first to FIGS. 1 and 2, there are shown schematics of exemplary embodiments of a homogenizing fuel system 20 according to aspects of the present invention for use in conjunction with a "common rail" diesel engine, the respective embodiments differing primarily in the fuel system control means—electrical versus mechanical—more about which will be said below. As a threshold matter, it is noted that while a number of engine components are shown as part of the figures generally throughout, such as the common rail or fuel gallery, the injectors, the fuel filter, the diesel tank and lift pump, and related fuel lines and the like, all such components or any variations thereof or substitutions therefor may be employed, whether factory-installed or after-market, in conjunction with the present invention without departing from its spirit and scope. Thus, while such components are shown in the figures as part of the overall fuel system, it is to be understood that the invention is expressly not limited thereto and that no claim is made to such standard components of an engine, which are provided herein simply as context for the homogenizing fuel system of the present invention. Moreover, again, while the exemplary embodiments are specifically shown and described in connection with a diesel internal combustion engine, a variety of other engines now known or later developed may be employed, including but not limited to gasoline direct injection engines.

In the first exemplary embodiment of FIG. 1, there is shown an overall fuel system 20 generally including a diesel tank 30 with a lift pump 32 and a pressurized propane tank 40 both feeding into a circulation loop generally designated 50 and including an infusion tube 70, the circulation loop 50 being in fluid communication with the engine's injection system common rail 90 and injectors 91, here by way of the fuel filter 99. In more detail, the diesel tank 30 supplies diesel fuel through a fuel line 31 by way of the lift pump 32 at about 5 psi, all of which are factory-installed equipment that could be self-contained within the tank 30 or separately configured as shown for convenience in FIG. 1. The diesel fuel then passes via fuel line 33 to a further circulation loop delivery pump 34 that takes the diesel fuel up to approximately 15-20 psi in the exemplary embodiment. It will be appreciated that the circulation loop delivery pump 34 may be any fluid pump now known or later developed and configured for appropriate pressures and power draw and to accommodate diesel and other such light oil fuels, including but not limited to turbine-style, rotary vane, or roller vane pumps as manufactured by Robert Bosch LLC in Farmington Hills, Mich., or proprietary positive displacement pumps configured to accommodate liquid-gaseous fuel mixtures as manufactured or licensed by US Airflow in Vista, Calif., which pump technology is the subject of numerous co-pending patent applications, including but not limited to PCT App. No. US2005/018142, filed May 23, 2005, and PCT App. No. US2008/012533, filed Nov. 6, 2008. In alternative embodiments, one or more such delivery pumps may be multi-stage or may be ganged or placed in series to achieve the necessary throughput and pressurization. Any or all such delivery pumps as well as other circulation pumps, high pressure positive displacement pumps or the like that are employed within the system may be powered and controlled using any appropriate means now known or later developed, including but not limited to a pulse-width modulator (not shown). Back to the fuel enhancement system 20, in the first exemplary embodiment, there is provided a flow sensor 43 in-line between the diesel tank 30 and the circulation loop 50, there being a fuel line 35 connecting the circulation loop delivery pump 34 and the flow sensor 43 and a further fuel line 41 from the flow sensor 43 to the fuel line 51 of the circulation loop 50. Additionally, the propane tank 40 supplies propane through fuel line 37 to a flow control valve 44 that then supplies propane through fuel line 38 to the fuel line 41 carrying the diesel fuel as metered by the flow sensor 43. Preferably the propane tank 40 is regulated to a minimum pressure of at least approximately 10 psi greater than the pressure in the fuel line 41 into which the propane is feeding, in the exemplary embodiment, once more, on the order of 15-20 psi. The flow control valve 44 is controlled by a microprocessor control 45 or the like, which control 45 may be any such device now known or later developed for electrically controlling valves or other such flow control devices and may act on data received from a variety of inputs including but not limited to the flow sensor 43 of the exemplary embodiment, a throttle sensor, or another such monitoring device in a manner known in the art. Accordingly, those skilled in the art will appreciate that while an exemplary electronic metering control is shown and described in connection with the first exemplary fuel enhancement system 20 of FIG. 1, the invention is not so limited, but may instead involve any such components in a variety of combinations and configurations without departing from its spirit and scope. In the exemplary embodiment, the ratio of fuels within the fuel mixture is more than ninety percent (90%) diesel and less than ten percent (10%) propane by volume at the point of mixing, assuming the mixing pressure is at a nominal 80 psi. Generally, the higher the mix pressure the higher the gain, such that it will be appreciated that higher pressures within the system at or after the point of mixing may be employed without departing from the spirit and scope of the invention. It will be further appreciated by those skilled in the art that while two particular fuel constituents are described as comprising the fuel mixture, namely liquid diesel fuel and gaseous propane, and within a specific proportion range, the invention is not so limited and a variety of other fuels as that term is used herein may be employed in various combinations and proportions in conjunction with a homogenizing fuel enhancement system according to aspects of the present invention without departing from its spirit and scope, as further evidenced by the alternative exemplary embodiments of FIGS. 9 and 10 discussed below. In whatever proportion the fuel constituents are mixed, it will be appreciated that with that ratio set and dictated by the microprocessor control 45 based on data it receives from the flow sensor 43 in the diesel fuel line and the resulting control it has of the propane delivered to the diesel fuel through the flow control valve 44, there is thus no variation in the actual proportion or ratio of the constituents within the fuel mixture, which remains substantially constant in operation. And though the flow control valve could be "always on" and the flow therethrough of propane increased or decreased to remain at the desired proportion relative to the diesel fuel flowing through fuel line 41 as measured and reported by the flow sensor 43, in the preferred embodiment the flow control valve 44 is simply switched "on" and "off" by the microprocessor control 45, with the frequency and duration of the "on" propane "pulses" being again dictated by the flow rate of the diesel fuel so that the resulting fuel mixture is of a substantially constant ratio of diesel to propane and only the total volume of such mixture is turned up and down by the system in response to the demands of the engine; i.e., the demand for diesel fuel as dictated by throttle position controlling the injector pump 95 downstream and thereby having an upstream effect on the flow rate of diesel fuel from the tank 30 as measured by the flow sensor 43. It will be appreciated that, as such, the fundamental operation of the engine's fuel delivery system is unaffected by the addition of the homogenizing fuel enhancement system 20 of the present invention, which operates essentially outside and independent of the factory equipment. While a particular group of electronic control devices operably connected in a particular configuration is shown and described in connection with FIG. 1 and metering and delivering to the circulation loop 50 of the fuel enhancement system 20 a substantially fixed-ratio liquid-gaseous fuel mixture, those skilled in the art will appreciate that a number of other such control devices may be employed in various combinations to effectively meter and control the mixing of two or more fuel components without departing from the spirit and scope of the present invention.

With continued reference to FIG. 1, the exemplary diesel-propane fuel mixture is passed through fuel line 41 to the circulation loop 50, specifically, where the fuel line 41 tees into a fuel line 51 returning excess fuel from the injection pump 95 for recirculation. Fuel line 51 is in fluid communication with the inlet leg 61 of an optional heat exchanger 60 having one or more switchback legs 62 before passing through an outlet leg 63 of the heat exchanger 60 and into a further fuel line 52 of the circulation loop 50. In the exemplary embodiment wherein the circulation loop 50 includes such a heat exchanger 60, it will be appreciated that the additional flow passages and the resulting increased surface area has a cooling effect on the fuel mixture as it passes therethrough. In the present invention, this is desirable not only in that generally to maintain lower fuel temperatures relative to the vehicle's under hood temperature is known to contribute to a more stable and more complete downstream combustion (i.e., reducing inlet fuel temperature has a correlated effect on reduced combustion temperature) and thus to reduced emissions and engine wear. Reduced fuel temperature within the circulation loop 50 is further desirable in the specific context of the present invention as it relates to the infusion tube 70 immediately downstream of the heat exchanger 60 in the exemplary embodiments of FIGS. 1 and 2, in which the fuel mixture is slowed and, based on the fluid flow dynamics within the volumetric expansion of the infusion tube 70, more about which is said below in connection with FIG. 6, the fuel mixture, and particularly the gaseous component thereof, here the propane, further cools and infuses within the liquid fuel component, here the diesel, thereby resulting in a substantially homogeneous fuel mixture passing through the remainder of the circulation loop 50 and made available to the engine's common rail 90. Furthermore, cooling such a diesel-propane fuel mixture as employed in the exemplary embodiment effectively reduces vapor formation within the system, thereby helping prevent vapor lock. Thus, it will be appreciated that generally a heat exchange device of some kind installed within the circulation loop 50 to cool the fuel mixture as it circulates has advantages in use, particularly in the context of the novel infusion tube 70 also included in the circulation loop 50 of the present invention. As such, it will be further appreciated that while a radiator-style heat exchanger 60 is shown and described in connection with the exemplary embodiments of FIGS. 1 and 2, the invention is not so limited, but instead may include any heat exchange device now known or later developed, if any, without departing from the spirit and scope of the invention, including but not limited to optional heat exchange fins 89 (FIGS. 3-6) formed on the infusion tube 70 instead of or in addition to any other heat exchange or cooling devices within the fuel enhancement system 20. As mentioned briefly above, immediately downstream of the heat exchanger 60 is the infusion tube 70, with fuel line 52 as part of the overall circulation loop 50 interconnecting the outlet leg 63 of the heat exchanger with the inlet tube 75 (FIGS. 3-6) of the infusion tube 70. The fuel mixture then passes through the infusion tube 70 and out the outlet tube 76 (FIGS. 3-6) as described separately in much greater detail below. In sum, it is in the infusion tube 70, which is a specifically configured volumetric expansion within the circulation loop 50, that the liquid-gaseous fuel mixture becomes substantially homogeneous as the gaseous fuel component is effectively infused within or dispersed throughout the liquid fuel component as caused at least in part by the geometry of the infusion tube 50 and the resulting fluid dynamic effects on the fuel mixture. The substantially homogeneous and relatively cool fuel mixture exiting the infusion tube 50 through the outlet tube 76 (FIGS. 3-6) then passes through fuel line 53 to the fuel filter 99. From the fuel filter 99, the fuel mixture next passes through the only outlet fuel line 92 to a circulation pump 93 that takes the fuel mixture up to a nominal pressure of approximately 60 psi before it passes along fuel line 94 to the engine's injection pump 95 that in the exemplary common rail diesel engine configuration takes the fuel mixture up to a working pressure on the order of 25,000 psi. The fuel mixture needed by the engine is delivered from the injection pump 95 along fuel line 96 to the common rail 90, while unneeded fuel, or fuel beyond the engine's present demand, recycles through the circulation loop along fuel line 51 also in fluid communication with the injection pump 95 and so the cycle continues back through the heat exchanger 60 as above-described, with additional fuel mixture entering the circulation loop 50 as needed and joining the recycled fuel just before the heat exchanger 60. It will be appreciated by those skilled in the art that the circulation pump 93 and the injection pump 95 may be of any type now known or later developed for the purpose of delivering and pressurizing the fuel mixture, here, the two being factory-installed equipment. As factory-installed and configured, both the circulation pump 93 and the injection pump 95 run continuously when the engine is running. It is then important to note for these purposes that the homogenizing fuel enhancement system 20 of the present invention and the operation of the infusion tube 70 as described above and further below in more detail serves to effectively mix and infuse the gaseous fuel component within the liquid fuel component, such that the resulting circulated, substantially homogenous mixture is effectively seen by the rest of the system, and the delivery and injection pumps, specifically, as a liquid. It will be further appreciated that the circulation loop 50 as thus shown and described herein is a dynamic system that continuously mixes and circulates the fuel mixture, whereby there is no static operation, holding tanks, dead spaces, or the like as in prior art circulation systems. In addition, by effectively existing and operating outside of the engine's injection system, the circulation loop 50 is once again capable of not only continuous and dynamic circulation, but thereby also maintaining the substantially homogeneous fixed ratio of liquid and gaseous fuel components in a low-pressure management context versus the high-pressure context of the common rail 90. As is standard on many common rail diesel engines and other such engines, unused or blow-by fuel from both the common rail 90 and the individual injectors 91 is fed back into the fuel filter 99 along spill-port fuel lines 97 and 98, respectively, for further recirculation and use. Similarly, a further novel feature of the present invention as it relates to the infusion tube 70 is the inclusion therein of an accumulator mechanism 84 (FIG. 3), which includes a blow-by outlet 82 (FIG. 3) in its base for passing fuel that has seeped by the accumulator mechanism 84 out of the infusion tube 70 and through a blow-by return line 68, in the exemplary embodiment, teeing back into the fuel line 33 between the lift pump 32 and the circulation loop delivery pump 34 for further processing. Finally, the exemplary embodiment of FIG. 1 also includes a bypass fuel line 65 teeing from the fuel line 35 between the circulation loop delivery pump 34 and the flow meter 43 and connecting directly to the filter 99, thereby bypassing the flow meter 43 and fuel additive source 40 and the entire circulation loop 50 and thus enabling the provision of pure diesel directly to the engine's common rail 90 if there were to be a problem in another portion of the fuel enhancement system 20. Controlling the operative flow of diesel through the bypass fuel line 65 is an in-line pressure switch or check valve 66 that only opens if the pressure on the downstream side of the valve 66 (i.e., the pressure in the fuel filter 99 or the fuel line 92 running to the circulation pump 93, injection pump 95, and ultimately the common rail 90, drops to a point below the pressure in the bypass fuel line as dictated by the circulation loop delivery pump 34, here on the order of 15-20 psi, which would indicate that the engine is not getting sufficient fuel for some reason. Those skilled in the art will appreciate that in this way the homogenizing fuel enhancement system 20 of the present invention has a fail-safe mode of operation wherein if there is any downstream failure of any component within the circulation loop 50, there is a clog somewhere in the related lines, or there is simply no more fuel additive (i.e., the propane tank 40 is empty or low on pressure), the system 20 will simply revert to running on only diesel fuel, such that the engine or vehicle will continue in an uninterrupted or seamless operation as it transitions back to its original "diesel only" fuel system, with the only downside being the factory fuel mileage rather than the enhanced mileage achieved through implementation of the present invention. This effect is again appreciated in view of the fact that the fuel enhancement system 20 of the present invention operates essentially outside and independent of the factory fuel system equipment, which easily and conveniently lends itself to such a "fail-safe" fuel bypass. It will be further appreciated that while a particular arrangement of the fuel system components and their connectivity through a number of fuel line segments is shown and described in connection with the exemplary embodiment of FIG. 1, the present invention is not so limited. Rather, such components and the means by which they are connected and rendered inter-operable may take a variety of configurations without departing from the spirit and scope of the invention. Again, since FIG. 1 is a schematic view of one fuel system embodiment according to aspects of the present invention, the relative sizes and shapes of the various components are not to be taken strictly, but instead are to be understood as being merely illustrative of the principles and features of the homogenizing fuel enhancement system of the present invention. Accordingly, the substitution of various alternative components serving substantially the same function as those shown and described is possible in the present invention and is expressly to come within its scope.

Turning briefly to FIG. 2, there is shown an alternative embodiment of the fuel system 20 of the present invention much like that of FIG. 1 configured for use in conjunction with a common rail diesel engine, where here there is a mechanical rather than electronic control of the metering and delivery of the fuel components to the circulation loop 50. Specifically, rather than a microprocessor control 45 operably connected to a flow sensor 43 in the diesel fuel line and a flow control valve 44 in the propane fuel line (FIG. 1), instead a metering pump 36 is employed in mechanically metering the fuel components for subsequent mixing. Here, the circulation loop delivery pump 34 passes the diesel fuel from the tank 30 to the metering pump 36 by way of fuel line 35. Separately, the propane gaseous fuel as supplied by pressurized tank 40 passes to the metering pump 36 via fuel line 37 at an approximate regulated pressure to be fixed within the range of 30-80 psi. The metering pump serves to mechanically meter and mix the diesel and propane using any such pump technology now known or later developed, potentially involving multiple discrete pumps or piston units that are slaved to a common drive so as to again effectively mechanically meter the respective fuel constituents passing therethrough. That is, in this alternative exemplary embodiment, the geometry and mechanical operation of the metering pump 36 will set or fix the volumetric ratio of the diesel relative to the propane in a manner generally known in the art, with the metering pump 36 then being turned up or down or simply "on" or "off" based on the demands of the engine, as described more fully below, again, without any variation in the actual proportion or ratio of the constituents within the fuel mixture, which remains substantially constant. Those skilled in the art will appreciate that the operation of the metering pump 36 as it relates to the total volume of fuel mixture delivered to the circulation loop 50 may be tied to one of a number of control or measurement devices now known or later developed, such as a downstream mechanical pressure switch, a flow meter, a throttle sensor, or a microprocessor electronic control (the latter example effectively being a combined electro-mechanical control system). In the case of a mechanical switch, it will be appreciated that such could be operable within the metering pump 36 itself, within the infusion tube 70 as triggered by the position of the accumulator piston 85, as by one or more pressure, position or proximity switches, more about which will be said below in connection with FIG. 3, or simply within a fuel line downstream of the metering pump 36 as shown. Specifically, in the exemplary embodiment, a first fuel line 38 coming out of the metering pump 36 is for metered delivery of the diesel fuel, while a separate second fuel line 39 also coming out of the metering pump 36 carries the propane or other gaseous fuel component, also mechanically metered and not yet mixed with the diesel. In this embodiment, preferably a pressure switch 42 is then placed at some location within the first fuel line 38 carrying the liquid diesel fuel before the mixing point where the first fuel line 38 joins the second fuel line 39, which will enable more accurate and consistent feedback of the actual fuel system demands than by monitoring pressure in the gaseous fuel line or in a downstream fuel line in which a liquid-gaseous fuel mixture is being circulated. Once again, those skilled in the art will appreciate that while a number of variations for mechanical metering, sensing, and control of the fuel mixture and delivery processes have been shown and described, the invention is not so limited but may instead involve a variety of other such components now known or later developed in providing the operable effects. In any case, the exemplary diesel-propane fuel mixture is passed from the metering pump 36 and the first and second fuel lines 38, 39 through single fuel line 41 to the circulation loop 50 for further processing as described above in connection with FIG. 1. A heat exchanger 60 is again shown in-line within the circulation loop 50 between the inlet point for additional fuel mixture as supplied by fuel line 41 and the downstream infusion tube 70, though once more it will be appreciated that other such cooling devices alone or in combination may be employed in the homogenizing fuel enhancement system 20 of the present invention.

Referring now to FIGS. 3-6, there are shown various enlarged schematic views of the infusion tube 70 of FIGS. 1 and 2 so as to better illustrate its structure and function. It will be appreciated that, as schematics, FIGS. 3-6 are not necessarily drawn to scale and so are not to be taken as exact representations particularly as to how the infusion tube would be dimensioned or proportioned (e.g., length, width, wall thicknesses, etc.). Rather, these schematics, again, are representative of the overall structure and principles of operation of the novel infusion tube 70 that is part of the fuel enhancement system 20 of the present invention, and particularly the circulation loop 50.

First, in FIG. 3 there is shown an enlarged schematic cross-sectional view of the infusion tube 70. It can be seen that in the exemplary embodiment the infusion tube 70 generally comprises an annular tube wall 71 capped at each end by an annular upper wall 72 and an annular lower wall 80, each sealed within the tube wall 71 by at least one seated o-ring 83 in a manner known in the art. One or both of the upper and lower walls 72, 80 may be integral with the tube wall 71 or may be permanently or removably installed within the tube wall 71 so as to form the infusion tube 70 using any assembly technique now known or later developed, including but not limited to press or interference fit, threaded engagement, bonding, welding, retaining rings or other mechanical couplings or retainers, etc. In the exemplary embodiment, snap rings 79 are configured to engage respective grooves (not shown) formed in the tube wall 71 so as to trap each end wall 72, 80 against a stepped shoulder formed in each end of the tube wall 71, thus temporarily securing the end walls 72, 80 in a secure and sealed manner while still allowing for relatively easy removal of one or both walls 72, 80 for repair or inspection of the inner components of the infusion tube 70. For example, an accumulator mechanism generally designated 84 is installed in the lower end of the infusion tube 70 adjacent the lower wall 80, the accumulator mechanism 84 comprising a piston 85 slidably installed within the infusion tube 70 and biased upwardly, or toward the upper wall 72, by a spring 86 installed between the piston 85 and the lower wall 80. A resilient seal or piston ring 87 is seated within the piston 85 to slidingly and sealingly engage the tube wall 71. The piston ring 87 can take any appropriate shape and be formed of any suitable materials now known or later developed, including but not limited to a Buna-N o-ring, lip seal, or u-cup piston seal. As such, the accumulator mechanism 84, and the piston 85 particularly, defines an upper space or infusion volume 88 within the infusion tube 70 above the piston 85 between the piston 85 and the upper wall 72, bounded laterally by a portion of the tube wall 71. It will be appreciated that the infusion volume 88 will fluctuate depending on the pressure in the circulation loop 50 generally and in the infusion tube 70 specifically, with the spring 86 taking up those variances and serving to apply through the accumulator piston 85 the appropriate pressure on whatever fuel mixture is in the upper volume 88 at any given time, more about which will be said below particularly in connection with FIG. 6. It will be appreciated that a separate commercially available bladder-style accumulator, for example, may be substituted for the accumulator mechanism 84 without departing from the spirit and scope of the present invention. In the exemplary piston-style accumulator 84, in connection with measurement of pressure or other such system data for the purpose of feedback and control of the metering and delivery process for the fuel mixture, and by way of further example, a magnetic material may be employed within at least a portion of the piston 85 and at least one corresponding position or proximity switch as is known in the art may be configured within the tube wall 71 of the infusion tube 70, such that relative vertical movement of the piston 85 within the infusion tube 70 as an indicator of circulation loop pressure and hence fuel demand by the engine can be ascertained and communicated to a control device such as a microprocessor 45 (FIG. 1) or metering pump 36 (FIG. 2). With continued reference to FIG. 3, in the exemplary embodiment, two holes or first and second upper passages 73, 74 are formed in the upper wall 72 to serve as inlet and outlet, respectively, of the infusion tube 70 for the fuel traveling through the circulation loop 50, though it will be appreciated that in alternative embodiments there may be more than two total passages and one or more of the inlets or outlets may be positioned in the tube wall 71 rather than the upper wall 72, for example, as shown schematically in FIGS. 1, 2 and 7-10, such that the exemplary structure is to be appreciated as being merely illustrative. As a further aspect of the inlet and outlet of the infusion tube 70 in the exemplary embodiment, a relatively shorter inlet tube 75 is shown as being installed within the first upper passage 73 and a relatively longer outlet tube 76 is shown as being installed within the second upper passage 74, once again, more about which will be said below. In sum, though, the fluid flow path into and out of the infusion volume 88 of the infusion tube 70 then involves in the exemplary embodiment flow through the inlet tube 75 and down through the infusion volume 88 against the slight pressure resistance of the accumulator mechanism 84 until reaching the outlet tube bottom end 78 so as to travel up the outlet tube 76 and back into the circulation loop 50. As will be more fully appreciated from the below discussion in connection with FIG. 6, this flow path as dictated, in part, by the longer outlet tube 76 relative to the inlet tube 75, and hence the spatial position of the inlet tube bottom end 77 above the outlet tube bottom end 78, creates a dynamic flow effect within the volumetric expansion or infusion volume 88 of the infusion tube 70 that causes an infusion or substantially homogenous mixing of the liquid-gas fuel mixture without necessarily requiring circulation loop pressures sufficient in and of themselves to liquefy any gaseous fuel component in the fuel mixture, which it will be appreciated has tremendous advantages in practice. In an exemplary embodiment, the infusion tube 70 is configured with a tube wall 71 made of steel or extruded aluminum tubing having a nominal outside diameter of two inches (2") and nominal inside diameter of one and seven eighths inch (1⅞") and an overall length of approximately twenty-one inches (21"). Alternatively, the tube wall 71 may also be formed of an outer aluminum extrusion with an inner steel sleeve for wear resistance or other reasons, in such an embodiment the inner sleeve may be shorter than the outer aluminum extrusion by the appropriate amount such that the sleeve itself forms the upper and lower shoulders against which the upper and lower walls 72, 80 may seat. The upper and lower walls 72, 80 are formed of an aluminum or steel disk having an outside diameter roughly equivalent to the inside diameter of the tube wall 71. The thickness of the upper wall 72 is roughly two and half inches (2½") and the thickness of the lower wall 80 is roughly one and half inch (1½"). The piston 85 of the accumulator mechanism 84 is also a steel or aluminum disk having an outside diameter roughly equivalent to the inside diameter of the tube wall 71 and a thickness of roughly one and half inch (1½"). The spring 86 is a nominal one inch (1") coil spring having an at rest length of roughly four inches (4"). The spring 86 may be held in place substantially centered on the piston 85 and/or lower wall 80 by a center stud (not shown). The piston ring 87 positioned on the piston 85 is a nominal three eighths (⅜") thick u-cup piston seal made of Buna-N. Based on the foregoing illustrative dimensions, it will be appreciated that the nominal or at-rest length of the space defining the infusion volume 88 within the infusion tube 70 is about eleven and half inches (11½"). Extending into this volume lengthwise is the outlet tube 76 having a nominal length from the base of the upper wall 72 of about eleven inches (11"), such that there is approximately a half inch (½") clearance between the lower end 78 of the outlet tube 76 and the accumulator piston 85. The outlet tube 72 is a nominal half inch (½") outside diameter (O.D.) and seven sixteenths inch (7/16") inside diameter (I.D.) steel tube. It follows that the approximate nominal or at-rest infusion volume 88 of the exemplary infusion tube 70 is thirty two cubic inches (32 in$^3$) (Volume=Length×Area=11.5 in.×($\Pi$×(0.94 in.)$^2$)) (not accounting for the movement of the piston 85 or the relatively negligible volume taken up by the outlet tube 76 of roughly two cubic inches (2 in$^3$)). Feeding into this infusion volume 88 is the fuel mixture through a nominal one quarter inch (¼") I.D. stranded cable, with a further restriction to about an eighth inch (⅛") based on the connectors. The fuel mixture exiting the fuel line 52 (FIGS. 1 and 2) into the infusion tube 70, and the infusion volume 88, specifically, via the inlet tube 75 thus goes through a relatively large expansion from a roughly eighth to quarter inch (⅛-¼") I.D. fuel line to a roughly two inch (2") I.D. infusion tube 70. This expansion and the subsequent length over which the fuel mixture then travels downwardly through the infusion volume 88 before exiting through the outlet tube 76 has the effect of greatly slowing and mixing the fuel mixture, as explained in even more detail below in connection with FIG. 6. Those skilled in the art will appreciate that the aspects and principles of the fuel enhancement system 20 of the present invention as it relates to the infusion tube 70 particularly are not in any way limited to the specific exemplary geometry and construction shown and described, which is to be understood as being merely illustrative, but instead may take a number of other configurations without departing from the spirit and scope of the invention. Relatedly, as another way of expressing the geometry of the exemplary infusion tube 70, it will be appreciated that the length-to-diameter ratio of the infusion volume 88 is on the order of five to one (5:1) (approximately a ten inch length versus approximately a two inch diameter). While again a variety of other configurations can be employed in the present invention, preferably the length-to-diameter ratio will remain in this five to one (5:1) order of magnitude range to get the desired effects, with the infusion tube 70 then being simply scaled up or down depending on the application (total fuel mixture through-put expected). In any case, the length-to-diameter ratio "order of magnitude range" in the exemplary embodiment would be from about two to one (2:1) up to about thirty to one (30:1), with again on the order of five to one (5:1) being preferable.

Briefly turning to FIGS. 4 and 5, there are shown schematic top and bottom views, respectively, of the infusion tube 70. In FIG. 4, viewing the infusion tube 70 from the top it can be seen that the inlet tube 75 is in the exemplary embodiment substantially centered in the upper wall 72 with the outlet tube 76 then being substantially parallel to and offset from the inlet tube 75. The fluid flow effects of this particular positioning of the inlet and outlet tubes 75, 76 will once again be best understood with reference to FIG. 6, discussed further below. The bottom view of FIG. 5 taken in conjunction with FIG. 3 shows a blow-by outlet 82 installed in a radially offset location in the bottom wall 80 of the infusion tube 70, though it will be appreciated that the exact location of the blow-by outlet 82 is in many ways arbitrary, so long as it does not interfere with the operation of the biasing spring 86 of the accumulator mechanism 84. It will be further appreciated as explained above in connection with FIG. 1 that the purpose of the blow-by outlet 82 is to allow any fuel mixture that has seeped by the piston 85, and the piston ring 87 specifically, to be collected and returned to the circulation loop 50, in the exemplary embodiment of FIGS. 1 and 2 by way of the inlet side of the circulation loop delivery pump 34. In connection with the fuel mixture passing by the piston 85 of the accumulator mechanism 84, those skilled in the art will also appreciate that such a fuel mixture including a light oil fuel like diesel will have a lubricating effect for the moving parts of the infusion tube 70, namely the piston 85 as it travels up and down within the tube 70 as bounded by the tube wall 71.

Figure 6:
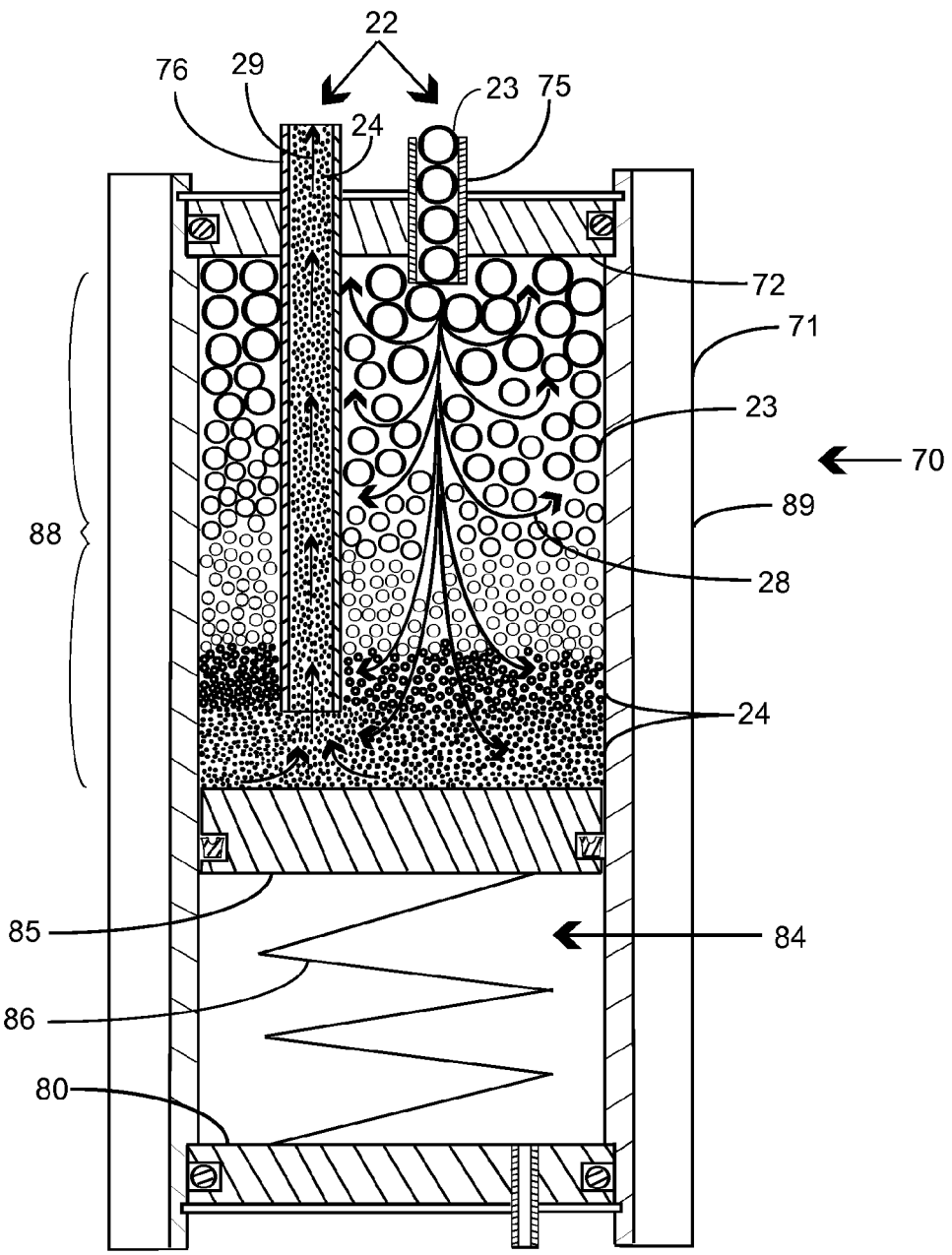
FIG. 6 is a side schematic thereof in use.

Referring now to FIG. 6, there is shown a schematic cross-sectional view of the infusion tube 70 illustrating the flow and fluid dynamics of the fuel mixture as it moves through the infusion tube 70 as part of the circulation loop 50 (FIGS. 1 and 2). As the fuel mixture generally designated 22 enters the infusion volume 88 of the infusion tube 70 through the inlet tube 75, the mixture 22 is in the exemplary embodiment a liquid-gaseous mixture, namely diesel plus propane, at a nominal pressure on the order of 20 psi, thus well below the pressure at which propane undergoes a phase transformation from gas to liquid at atmospheric temperature (approximately 125 psi). As such, the liquid-gaseous fuel mixture continues to have at least one constituent in the gaseous phase when mixed and circulated and when introduced into the infusion tube 70, specifically. Therefore, as shown schematically in FIG. 6, as the fuel mixture 22 enters the inlet tube 75, it includes relatively large bubbles 23 representative of the gaseous propane. But as the fuel mixture 22 flows downward within the infusion volume 88 as indicated by arrows 28 in FIG. 6 an eddy current effect is caused as the incoming liquid disperses within the liquid already present within the infusion volume 88. In addition, such descending liquid fluid flow resists the tendency of the bubbles 23 to rise, which action causes the bubbles 23 to break apart until by the time the mixture 22 reaches the bottom of the infusion volume 88 and begins to make its way up the exit tube 76 and out of the infusion tube 70, the bubbles as generally designated 24 are now relatively small as being representative of the propane that has been sufficiently dispersed within the diesel fuel to form a substantially homogeneous liquid-gaseous fuel mixture 22 upon exiting the infusion tube 70 as indicated by arrows 29. In a bit more detail, the bubbles 23 representative of the propane or other gaseous fuel within the fuel mixture break apart upon entry into the infusion tube 70 effectively due to the shear forces in the liquid that overcome the surface tension of the bubbles, causing the bubbles to break apart and consequentially a reduction in bubble size. The eddy currents in the infusion tube 70 cause the fluid to work against itself, creating a turbulent mixing action. This action is deliberately intensified in the present design by the introduction of the fuel mixture into the top of the infusion tube 70, which provides an environment where the bubbles attempt to rise against the downward flow of the liquid-gas fuel stream. The result is a relatively controlled, repeatable process to divide and decrease the bubble size to the desired level and thoroughly mix the gaseous bubbles into the fuel stream, or disperse them within the liquid component of the fuel mixture, to provide the desirable result of massive atomization upon injection of the liquid fuel from within the fuel itself, instead of trying to influence the fuel from the outside as has been attempted in prior art designs. It will be appreciated by those skilled in the art that the infusion tube 70 thus has a number of beneficial physical effects on the fuel mixture 22 as it passes therethrough, all essentially dictated by the geometry and configuration of the infusion tube 70. Again, as the fuel mixture 22 exits the inlet tube 75 into the infusion volume 88 it undergoes a volumetric expansion that serves to slow down and cool the fuel mixture 22. This alone aids in the infusion process and, specifically, the tendency of the gaseous fuel component to contract. As described above, the downwardly flowing fuel mixture 22 also resists the tendency of the gas bubbles to rise, both by inertial and frictional effects. Once more, this confluence of descending fuel mixture and ascending bubbles tends to cause a replicating, cascading effect that further mixes or agitates the fuel mixture in a controlled turbulent mixing process, thereby minimizing any unnecessary heat or parasitic energy losses while creating a substantially homogenous liquid-gas fuel mixture. Thus, those skilled in the art will appreciate that the physical, spatial arrangement of the bottom end 77 of the inlet tube 75 above the bottom end 78 of the outlet tube 76 causes the above-described flow path and the resulting mixing effects. It will be appreciated that while the infusion tube 70 is illustrated as being substantially vertical, other orientations alone or in combination with other geometries of the infusion tube 70 and its components, particularly the inlet and outlet tubes 75, 76, are possible so as to maintain the relative positions of the bottom ends 77, 78 and still obtain the resulting fluid flow dynamics explained above. It will be further appreciated by those skilled in the art that the accumulator mechanism 84 cooperates with the other features of the infusion tube 70 to maintain consistent pressure in the fuel mixture 22 as it moves through the infusion volume 88, the accumulator also serving to take up pressure surges and the like felt throughout the circulation loop 50 in a manner known in the art. Thus, by locating the accumulator mechanism 84 within the infusion tube 70 its benefits for the circulation loop 50 and overall fuel enhancement system 20 are still realized while additional functionality in connection with homogenously mixing the fuel mixture 22 is also achieved, all while eliminating the need for a separate accumulator component somewhere else in the system. Therefore, those skilled in the art will appreciate that the effective combined infusion tube-accumulator structure has advantages within the fuel enhancement system 20 of the present invention on a number of levels.

More generally, it will be appreciated that the volumetric expansion and resulting eddy current and mixing effects provided by the infusion tube enables sufficient or substantially homogenous mixing of liquid and gaseous fuel components without the expense and complexity of running at higher pressures and/or temperatures to maintain one or more of the fuel components in a supercritical state or otherwise force through pressure the gaseous fuel component into a liquid state before, during and after mixing with the liquid fuel component as is widely taught in the prior art as effectively the only way to sufficiently mix such fuels together into a common stream prior to injection. The present invention involves no modification to the injection system or the injectors, specifically, as explained above, and so is in the exemplary embodiment literally a bolt-on design that does not affect a vehicle's injection system hardware and electronic controls or factory-installed safety or emissions equipment, though it will be appreciated that a fuel enhancement system according to aspects of the present invention may also be employed as a factory installation instead of an after-market add-on, in which case other aspects of the overall fuel delivery and injection system may be modified or streamlined accordingly, which implementation is also within the spirit and scope of the present invention. In any case, once such a liquid-gas fuel mixture is sufficiently mixed according to aspects of the present invention, and specifically once the gaseous fuel component is infused or dispersed within the liquid fuel component as above-described through the operation of the infusion tube 70 and maintained as such a substantially homogenous mixture through the continuous circulation loop 50 that exists outside of the injection system, upon injection in the conventional manner of the fuel mixture resulting from the fuel enhancement system 20 of the present invention through any number of injectors 91, it will again be appreciated that the gaseous component within the fuel mixture will have an atomizing effect on the liquid fuel component. That is, upon injection, the fuel mixture will undergo an immediate pressure drop from, in the case of a common rail engine, on the order of 25,000 psi to roughly 300 psi within the combustion chamber. This results in a rather violent expansion of the gaseous fuel component, and because it is substantially homogenously mixed or dispersed within the fuel mixture, the gaseous fuel component then atomizes the liquid fuel or rapidly scatters the liquid fuel throughout the combustion chamber for a substantially uniform and complete combustion. Again, this effect is achieved in the present invention without the need for maintaining high circulation pressures or supercritical states as is taught in the art. Beyond this physical atomization effect, other chemical or catalytic effects of one fuel component on the other may also be playing a role in the improved performance being seen. The end result is that more power is extracted from the fuel mixture during each combustion event, thereby causing more efficient operation of the engine, with gains on the order of thirty to one hundred percent (30-100%) or more being realized. In addition, such efficiency gains in no way negatively impact emissions, which is the usual trade-off in prior art approaches, the more complete combustion of the typically hydrocarbon-based liquid fuel resulting in less unburned carbon being exhausted, and since combustion and exhaust gas temperatures are not substantially increased, if at all, other unwanted emissions such as nitrous oxide (NOx) and carbon dioxide ($CO_2$) are also reduced.

Figure 7:
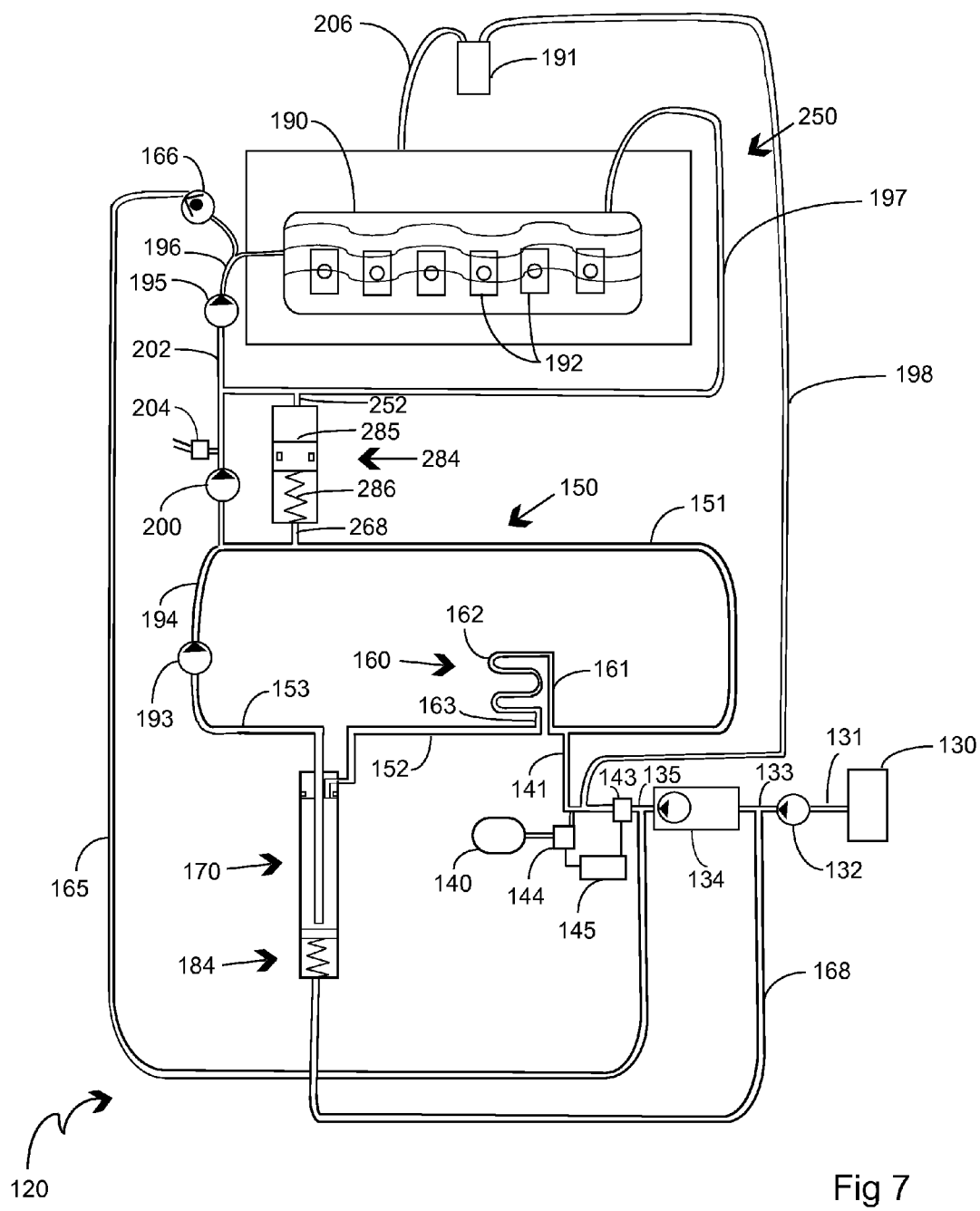
FIG. 7 is a schematic of a further alternative exemplary embodiment of the invention.
Figure 8:
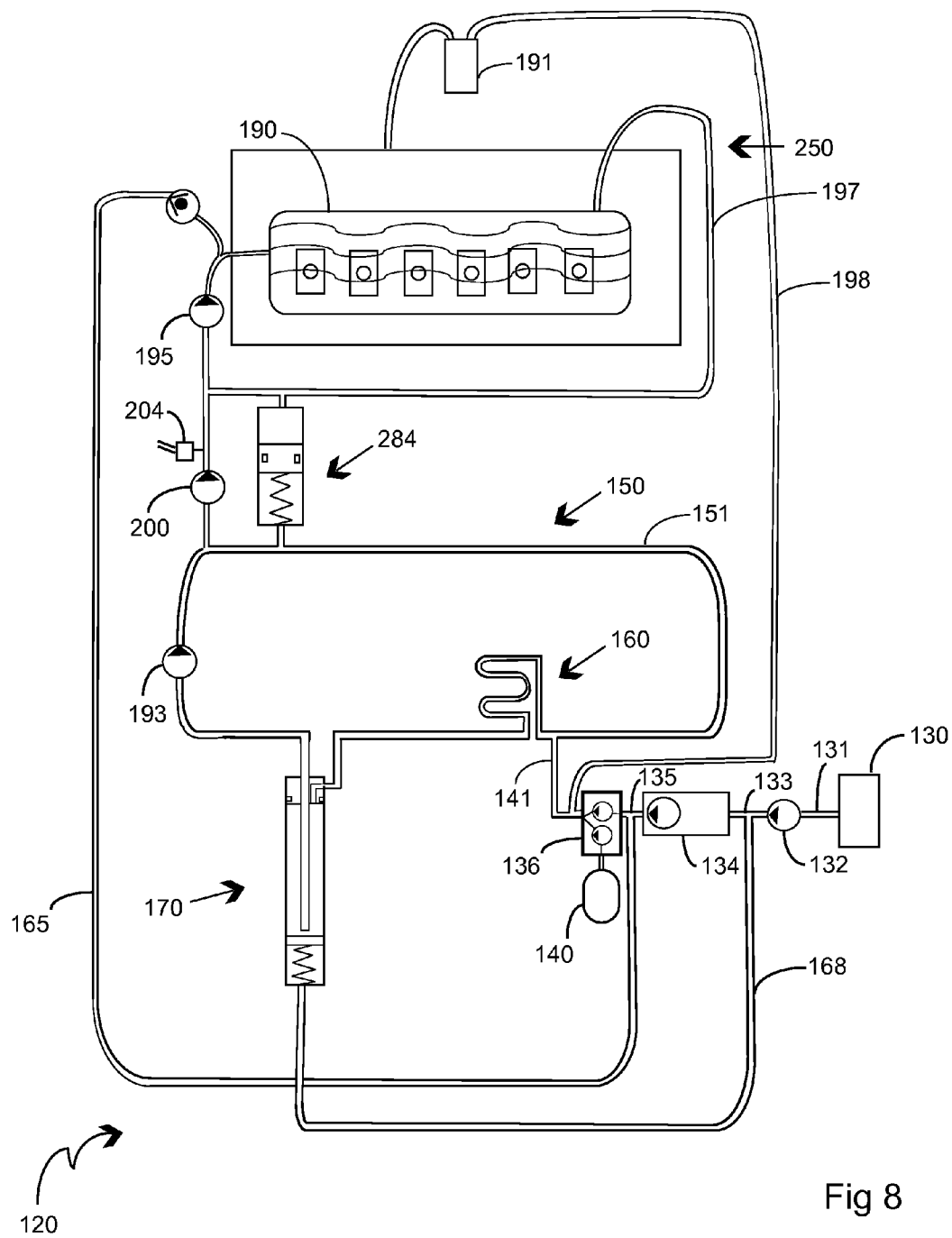
FIG. 8 is a schematic of a further alternative exemplary embodiment of the invention.
Figure 9:
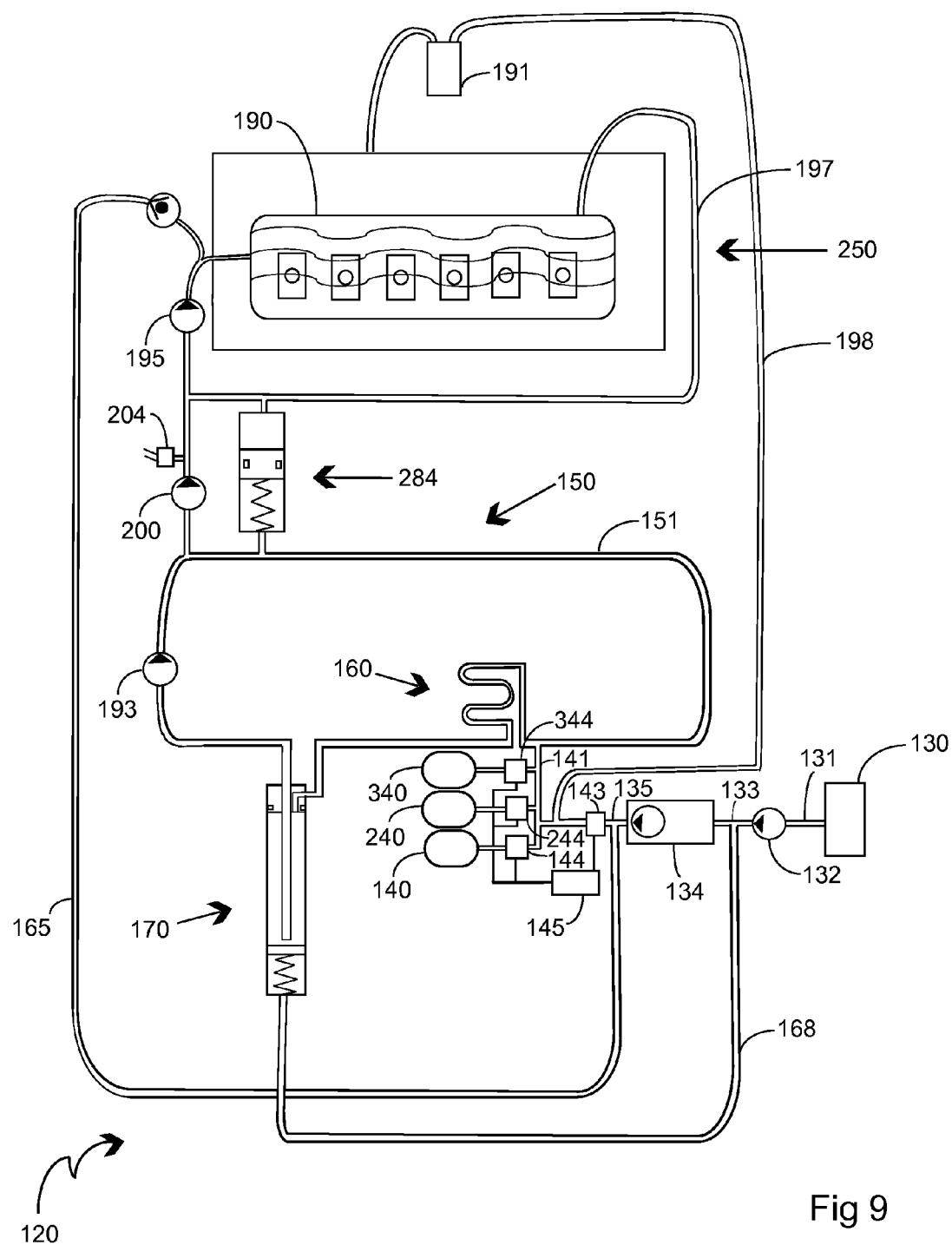
FIG. 9 is a schematic of a further alternative exemplary embodiment of the invention.
Figure 10:
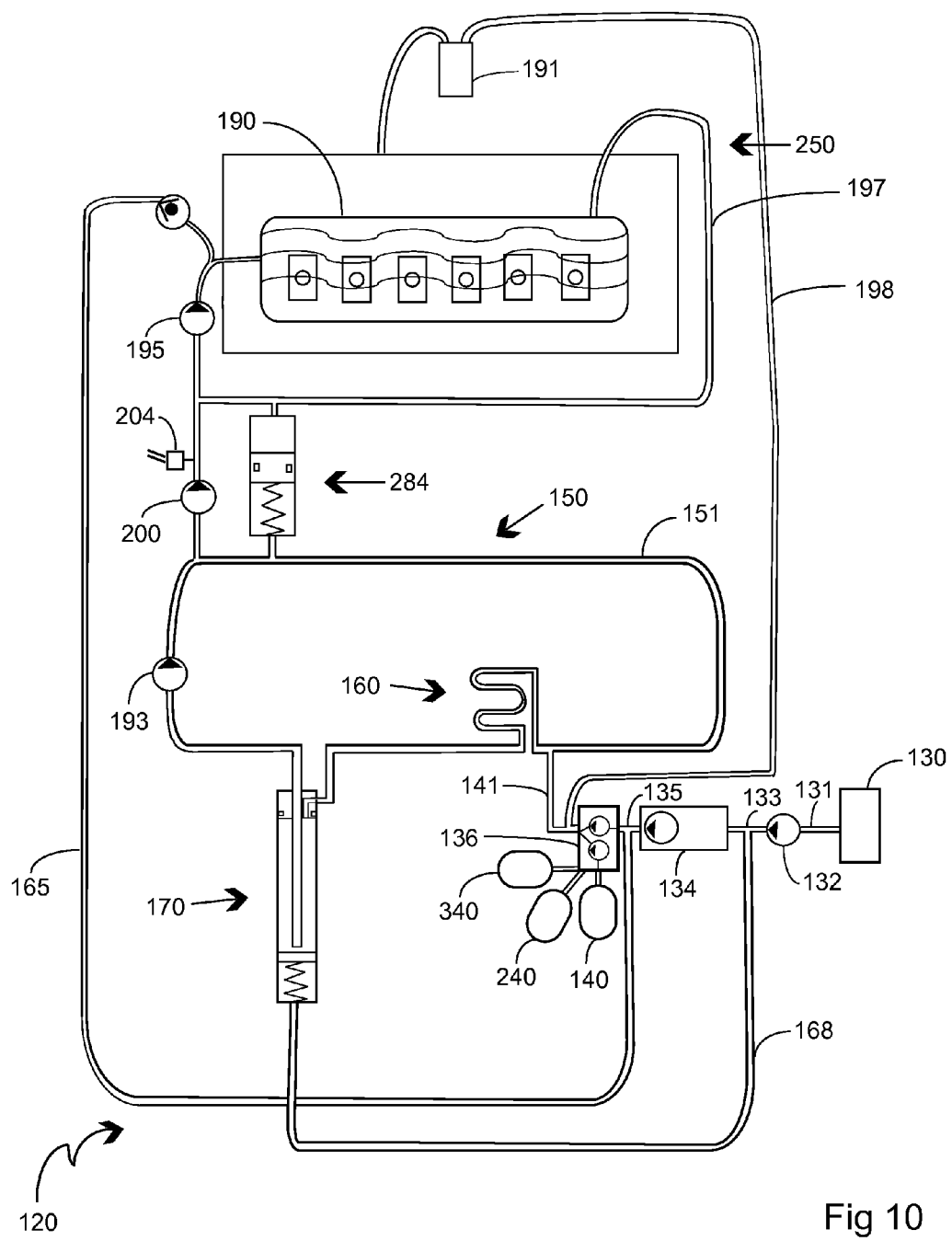
FIG. 10 is a schematic of a still further alternative exemplary embodiment of the invention.

Turning now to FIGS. 7-10, there are shown various alternative embodiments of a fuel enhancement system 120 according to aspects of the present invention as now applied to a mechanical or direct injection diesel engine. In such a context, it will be appreciated that while fuel line or circulation loop pressures may be seen or enabled by factory-installed fuel system equipment that differs from such equipment on a common rail engine, the further embodiments are shown and described merely to illustrate by way of example other ways that the fuel enhancement system 120 of the present invention may be implemented. Accordingly, once more, the present invention is to be understood as not being limited to any one particular embodiment or engine application, but is instead more broadly and generally directed to a fuel enhancement system 120 that may be employed in connection with a variety of engines now known or later developed. By way of further overview, it will be appreciated that FIGS. 7 and 9 are directed to alternative multi-fuel embodiments in the direct injection context wherein the fuel components are metered and mixed according to electronic controls and a circulation loop 150 that exists outside of the engine's injection system akin to the first exemplary embodiment of FIG. 1 and that FIGS. 8 and 10 illustrate embodiments wherein the fuel components are metered and mixed mechanically in a manner analogous to the exemplary embodiment of FIG. 2 in the common rail context. FIGS. 7 and 8 in the alternative electrical or mechanical control contexts, respectively, are similar in that, as in the embodiments of FIGS. 1 and 2, a single liquid fuel such as diesel and a single gaseous fuel such as propane are mixed to form the fuel mixture ultimately delivered to the fuel gallery 190, while FIGS. 9 and 10 in the alternative electrical or mechanical control contexts, respectively, are similar in that multiple gaseous fuel components such as propane, hydrogen and air are mixed with a single liquid fuel component, again diesel in the exemplary embodiment. Those skilled in the art will once again appreciate that while particular combinations of liquid and gaseous fuel components are illustrated, the fuel enhancement system 20 of the present invention is not so limited, but instead can effectively be employed in connection with a virtually infinite variety of fuels and fuel mixtures now known or later developed.

Referring now to FIG. 7, there is shown a schematic view of an alternative exemplary embodiment electronic-type control system for a diesel-propane fuel mixture that is to be delivered to a direct injection engine having a fuel gallery 190 with individual plungers 192 to deliver the fuel via line 206 to the individual injectors 191 (one being shown for simplicity) in a manner known in the art. The fuel enhancement system 120 of the present invention includes a flow sensor 143 in-line between the diesel tank 130 and the circulation loop 150, there being a fuel line 135 (FIG. 8) connecting the circulation loop delivery pump 134 and the flow sensor 143 and a further fuel line 141 from the flow sensor 143 to the fuel line 151 of the circulation loop 150. Additionally, the propane tank 140 supplies propane by way of a flow control valve 144 that then supplies the gaseous propane to the fuel line 141 carrying the diesel fuel as measured by the flow sensor 143. Once more, preferably the propane tank 140 is regulated to a minimum pressure of at least approximately 10 psi greater than the pressure in the fuel line 141 into which the propane is feeding, in the alternative exemplary embodiment, on the order of 40-50 psi based on the diesel tank lift pump 132 taking the pressure to about 10 psi and the engine lift pump or circulation loop delivery pump 134 taking the pressure up approximately another 40 psi—thus, the propane tank 140 in the alternative embodiment is preferably regulated to about 60-100 psi. Again, those skilled in the art will appreciate that the pumps and pressures described above are merely for illustration, with the lift pumps 132, 134 both being factory-installed equipment. The flow control valve 144 is again itself controlled by a microprocessor control 145 or the like, which control 145 may be any such device now known or later developed for electrically controlling valves or other such flow control devices and may act on data received from a variety of inputs including but not limited to the flow sensor 143 of the exemplary embodiment. Accordingly, those skilled in the art will appreciate that while an exemplary electronic metering control is shown and described in connection with the alternative fuel enhancement system 120 of FIG. 7, the invention is not so limited, but may instead involve any such components in a variety of combinations and configurations without departing from its spirit and scope.

With continued reference to FIG. 7, the exemplary diesel-propane fuel mixture is passed through fuel line 141 to the first circulation loop 150, specifically, where the fuel line 141 tees into a fuel line 151 of the first circulation loop 150. Fuel line 151 is in fluid communication with an optional heat exchanger 160 as above-described in connection with FIGS. 1 and 2 and then a further fuel line 152 of the circulation loop 150 that delivers the fuel mixture to an infusion tube 170, again, as described previously, such infusion tube 170 including a built-in accumulator mechanism 184 to cooperate in handling pressure surges within the first circulation loop 150. Here, the fuel mixture leaving the infusion tube 170 travels through fuel line 153 still part of the first circulation loop 150 to a first circulation pump 193 that simply circulates the fuel mixture through the first circulation loop 150, in the exemplary embodiment at a nominal pressure of on the order of 60 psi as dictated by the lift pumps 132, 134 and any back pressure in the system. The fuel mixture leaves the first circulation pump 193 through fuel line 194, which either feeds a high-pressure positive displacement pump 200 that pressurizes the mixture to a pressure on the order of 400 psi and in turn feeds a second circulation loop 250, and the engine's fuel gallery 190, specifically, based on the demands of the engine. In the exemplary embodiment, a proprietary positive displacement pump 200 configured to accommodate such liquid-gaseous fuel mixtures is employed as manufactured or licensed by US Airflow in Vista, Calif., which pump technology is the subject of numerous co-pending patent applications, including but not limited to PCT App. No. US2005/018142, filed May 23, 2005, and PCT App. No. US2008/012533, filed Nov. 6, 2008. The "on/off" operation of the positive displacement pump 200 is in the exemplary embodiment controlled by a pressure switch 204 positioned downstream of the pump 200 in fuel line 202, which switch 204 may also be a current limit switch or any other such switch now known or later developed. Unneeded fuel mixture not called for by the positive displacement pump 200 simply tees off of fuel line 194 to fuel line 151 for continual circulation within the first circulation loop 150. Once again, it will be appreciated that the continuous circulation and mixing of the fuel mixture, and particularly its passage through the infusion tube 170, maintains the liquid-gaseous fuel mixture in a substantially homogenous state even without taking the pressures in the loop 150 higher than the phase change pressure for the gaseous component of the fuel mixture, here propane. And again, the first circulation loop 150 exists completely outside of the engine's injection system, which has a number of advantages as previously described. On the other hand, the fuel mixture that is needed by the engine is delivered from the high-pressure positive displacement pump 200 along fuel line 202 to a second circulation pump 195 that then feeds the fuel gallery 190 via fuel line 196, where it is then ultimately injected by injectors 191 in a manner known in the art. Unused or blow-by fuel from the fuel gallery 190 is returned to the inlet side of the gallery 190 for reuse by passing along spill-port fuel line 197 so as to essentially form a second circulation loop 250, which it will be appreciated is circulating the fuel mixture at pressures on the order of 400 psi as dictated by the high-pressure positive displacement pump 200, while unused or blow-by fuel from the individual injectors 191 is fed back essentially into the first circulation loop 150 along spill-port fuel line 198 for further recirculation and use, line 198 teeing into fuel line 141 downstream of the diesel flow meter 143, whether before or after the propane entry point. A further novel feature of the present invention as it relates to the infusion tube 170 is again the inclusion therein of an accumulator mechanism 184 that includes a blow-by return line 168, in the exemplary embodiment, teeing back into the fuel line 133 between the tank lift pump 132 and the circulation loop delivery pump 134, or factory-installed engine lift pump, for further processing. Similarly, a further novel feature of the present invention is a second accumulator mechanism 284 located effectively between the first and second circulation loops 150, 250 to take out pressure surges in the second circulation loop 250 in a manner generally known in the art. Here, though, specifically, a fuel line 252 teeing into fuel line 197 feeds roughly 400 psi fuel mixture into the upper side of the accumulator, surges in which are absorbed by the piston 285 as biased upwardly by spring 286, with any seepage that gets past the piston 285 passing out of the second accumulator mechanism 284 through fuel line 268 that tees into fuel line 151 of the first circulation loop 150. Thus, it will be appreciated that the pressure differential on both sides of the second accumulator piston 285—roughly 400 psi above and 60 psi below, enables the accumulator to perform as designed while still capturing and reusing any fuel that seeps by the piston 285 during operation. Finally, the exemplary embodiment of FIG. 7 also again includes a bypass fuel line 165 teeing from the fuel line 135 (FIG. 8) between the circulation loop delivery pump 134 and the flow sensor 143 and connecting directly to fuel line 196 through which fuel is fed by way of the second circulation pump 195 into the fuel gallery 190, thereby bypassing the flow meter 143 and fuel additive source 140 and the entire first circulation loop 150 and thus enabling the provision of pure diesel directly to the engine's fuel gallery 190 if there were to be a problem in another portion of the fuel enhancement system 120. Controlling the operative flow of diesel through the bypass fuel line 165 is an in-line pressure switch or check valve 166 that only opens if the pressure on the downstream side of the valve 166 (i.e., the pressure in fuel line 196 delivering fuel to the fuel gallery 190 drops to a point below the pressure in the bypass fuel line as dictated by the circulation loop delivery pump 134, here on the order of 50-60 psi, which would indicate that the engine is not getting sufficient fuel for some reason. Those skilled in the art will appreciate that in this way the homogenizing fuel enhancement system 120 of the present invention has a fail-safe mode of operation wherein if there is any downstream failure of any component within the circulation loop 150 or other such issue, the system 120 will simply revert to running on only diesel fuel, such that the engine or vehicle will continue uninterrupted operation.

Turning briefly to FIG. 8, there is shown a schematic view of a further alternate embodiment fuel enhancement system 120 wherein a mechanical rather then electrical control is employed in a direct injection context otherwise similar to FIG. 7. Here, as discussed previously in connection with FIG. 2 in the context of the common rail system, the metering pump 136 mechanically meters the diesel and propane fuel in the exemplary embodiment. As a slight variation on the system of FIG. 2, the metering pump 136 as shown in FIG. 8 not only meters but internally mixes the two fuel constituents such that a single fuel line 141 exits the metering pump 136 and delivers such fuel mixture to fuel line 151 of the circulating loop 150. In such an embodiment, the metering pump 136 may integrally include the appropriate pressure switch or the like in at least the line associated with the liquid fuel constituent for mechanical control of the metering and mixing process as described above.

Referring now to FIGS. 9 and 10, there are shown schematics of still further exemplary embodiments of a fuel enhancement system 120 according to aspects of the present invention wherein multiple gaseous fuel components are introduced or infused into the diesel fuel rather than just one, namely propane, as in the previous exemplary embodiments. First, in the embodiment of FIG. 9 again involving electronic control of the metering process, there is again shown a diesel tank 130 from which liquid diesel fuel is supplied through the lift pump 132 and delivery pump 134 at an approximate pressure of 50-60 psi to the flow sensor 143. In response to the measured flow of diesel fuel, the microprocessor control 145 in electrical communication with both the flow sensor 143 and here in the alternative embodiment first, second and third flow control valves 144, 244, and 344, respectively, thereby selectively controls the release into the common fuel line 141 gaseous fuel constituents from first, second and third tanks 140, 240 and 340, respectively. Accordingly, appropriate amounts of each of the gaseous fuel components are mixed with the liquid diesel fuel under the control of microprocessor control 145 based on diesel flow data received from the flow sensor 143. As such, it will again be appreciated that the fuel enhancement system 120 of the present invention is capable of proportionately and controllably mixing one or more liquid fuel component with one or more gaseous fuel components, such that once more any number of combinations of such fuels may be mixed and maintained as a substantially homogenous mixture employing aspects of the present invention. In the exemplary embodiment of FIG. 9, the three tanks 140, 240 and 340 supply propane, hydrogen and air to the diesel fuel to form the liquid-gaseous fuel mixture. It will be appreciated that any such tanks may be replaced with, for example, an electrolysis apparatus (not shown) for the purpose of generating hydrogen gas on board or, in the case of air, simply a filtered inlet open to the environment for the purpose of drawing in ambient air, again, as metered by the flow control valves 244, 344, respectively. Accordingly, while three tanks 140, 240, and 340 are shown in the schematic of FIG. 9, it will be appreciated that the invention is not so limited, but may instead involve a variety of other gaseous fuel component storage and/or generation devices now known or later developed without departing from the spirit and scope of the invention. Turning briefly to FIG. 10, there is shown a schematic of yet another alternative embodiment of the fuel enhancement system 120 of the present invention wherein a mechanical metering pump 136 is employed rather than an electrical control system in metering and mixing liquid diesel propane 130 with gaseous propane, hydrogen, and air from sources 140, 240, and 340. The types of fuels that are mixed to form the liquid-gaseous fuel mixture, the proportions in which and pressures at which they are mixed, and the particular configurations of the one or more circulation loops and infusion tubes may vary without departing from the spirit and scope of the invention, Therefore, those skilled in the art will appreciate that aspects of the present invention may be employed in a number of configurations and contexts beyond the exemplary embodiments shown and described, such that the fuel enhancement system of the present invention is to be understood as not being limited to any particular embodiment shown and described herein.

More generally, whether or not expressly called out, the fuel pumps, valves, fuel lines, and the like employed in the various embodiments of the present invention may be any such components or equipment, in any configuration, size or scale, and function, now known or later developed. Thus, while particular relative sizes of the components are shown in the drawings, these are schematics merely to illustrate the principles of the invention and so are not otherwise to be limiting in any sense.

In sum, those skilled in the art will appreciate that aspects of the present homogenizing fuel enhancement system invention involve at least one circulation loop existing outside of the injection system for continuously circulating, mixing, and maintaining the homogeneity of a multi-fuel mixture apart from any demands by or delivery to the engine's injection system (whether a direct injection fuel gallery or a common rail), and at least one infusion tube configured within the at least one circulation loop for providing a volumetric expansion wherein the fuel mixture is able to slow and more sufficiently mix and thereby become relatively more homogeneous.

Accordingly, it will be appreciated by those skilled in the art that the present invention is not limited to any particular homogenizing fuel enhancement system, much less the particular exemplary embodiments shown and described, and that numerous such systems are possible without departing from the spirit and scope of the invention.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A homogenizing fuel enhancement system comprising an internal combustion engine configured to run on a fuel mixture formed onboard, and an infusion tube having a tube wall capped at each end by an upper wall and a lower wall, the upper wall being formed with an outlet passage, an infusion volume within the apparatus being defined at least in part by the space bounded laterally by at least a portion of the tube wall and above by the upper wall, the infusion tube further having an outlet tube installed within the outlet passage formed in the upper wall so as to extend toward the lower wall, the outlet tube having a bottom end that is substantially closer to the lower wall than the upper wall and that is relatively lower than any inlet formed in the apparatus, whereby the fuel mixture travels a substantial distance through the infusion volume before exiting through the outlet tube so as to promote agitation and mixing.

2. The homogenizing fuel enhancement system of claim 1, wherein the internal combustion comprises an injection system, the homogenizing fuel enhancement system further comprising:
a circulation system, receptive of controlled flow of liquid fuel and controlled flow of gaseous fuel, and disposed in fluid communication with the engine injection system, said circulation system providing a liquid-gaseous mixture of the liquid and gaseous fuels to the engine injection system and causing the liquid-gaseous mixture to traverse a circulation path within which the gaseous fuel is infused into the liquid fuel thereby forming the fuel mixture;
said circulation path providing an infusion volume through which the liquid-gaseous mixture traverses before being provided to the engine injection system, the infusion volume being at least a volume such that substantial homogeneity of the liquid-gaseous mixture is provided.

3. The homogenizing fuel enhancement system of claim 2 wherein a portion of the infusion volume is provided by the infusion tube disposed within the circulation path.

4. The homogenizing fuel enhancement system of claim 3 wherein the infusion tube defines an interior volume having a predetermined length and diameter, the length-to-diameter ratio of the interior volume ranging from approximately two-to-one (2:1) to approximately thirty-to-one (30:1).

5. The homogenizing fuel enhancement system of claim 2, wherein the circulation path further comprises a heat exchanger.

6. The homogenizing fuel enhancement system of claim 1, wherein the infusion tube further comprises an accumulator mechanism.

7. The homogenizing fuel enhancement system of claim 6, wherein the accumulator mechanism comprises a piston slidably installed within the infusion tube.

8. The homogenizing fuel enhancement system of claim 7, wherein the piston is biased toward the upper wall by a spring located between the piston and the lower wall.

9. The homogenizing fuel enhancement system of claim 8, wherein the piston further comprises a piston ring seated within the piston, said piston ring slidingly and sealingly engaging the tube wall.

10. A homogenizing fuel enhancement system for use in conjunction with an internal combustion engine configured to run on a fuel mixture formed onboard, the apparatus comprising an infusion tube having a tube wall capped at each end by an upper wall and a lower wall, the upper wall being formed with an outlet passage, an infusion volume within the apparatus being defined at least in part by the space bounded laterally by at least a portion of the tube wall and above by the upper wall, the infusion tube further having an accumulator mechanism and an outlet tube installed within the outlet passage formed in the upper wall so as to extend toward the lower wall, the outlet tube having a bottom end that is substantially closer to the lower wall than the upper wall and that is relatively lower than any inlet formed in the apparatus, whereby the fuel mixture travels a substantial distance through the infusion volume before exiting through the outlet tube so as to promote agitation and mixing.

11. The homogenizing fuel enhancement system of claim 10, wherein the internal combustion engine comprises an injection system, the homogenizing fuel enhancement system further comprising:

a circulation system, receptive of controlled flow of liquid fuel and controlled flow of gaseous fuel, and disposed in fluid communication with the engine injection system, said circulation system providing a liquid-gaseous mixture of the liquid and gaseous fuels to the engine injection system and causing the liquid-gaseous mixture to traverse a circulation path within which the gaseous fuel is infused into the liquid fuel thereby forming the fuel mixture;

said circulation path providing an infusion volume through which the liquid-gaseous mixture traverses before being provided to the engine injection system, the infusion volume being at least a volume such that substantial homogeneity of the liquid-gaseous mixture is provided.

12. The homogenizing fuel enhancement system of claim 11 wherein a portion of the infusion volume is provided by the infusion tube disposed within the circulation path.

13. The homogenizing fuel enhancement system of claim 12 wherein the infusion tube defines an interior volume having a predetermined length and diameter, the length-to-diameter ratio of the interior volume ranging from approximately two-to-one (2:1) to approximately thirty-to-one (30:1).

14. The homogenizing fuel enhancement system of claim 11, wherein the circulation path further comprises a heat exchanger.

15. The homogenizing fuel enhancement system of claim 10, wherein the accumulator mechanism comprises a piston slidably installed within the infusion tube.

16. The homogenizing fuel enhancement system of claim 15, wherein the piston is biased toward the upper wall by a spring located between the piston and the lower wall.

17. The homogenizing fuel enhancement system of claim 16, wherein the piston further comprises a piston ring seated within the piston, said piston ring slidingly and sealingly engaging the tube wall.

18. A method of homogenizing fuel, comprising:
forming a fuel mixture comprising a liquid fuel and gaseous fuel;
providing an infusion tube having a tube wall capped at each end by an upper wall and a lower wall, the upper wall being formed with an outlet passage, an infusion volume within the apparatus being defined at least in part by the space bounded laterally by at least a portion of the tube wall and above by the upper wall, the infusion tube further having an outlet tube installed within the outlet passage formed in the upper wall so as to extend toward the lower wall, the outlet tube having a bottom end that is substantially closer to the lower wall than the upper wall and that is relatively lower than any inlet formed in the apparatus; and
agitating and mixing the fuel mixture by providing the fuel mixture to the infusion tube to create a homogeneous fuel mixture.

19. The method of claim 18, further comprising:
providing a circulation system, receptive of controlled flow of liquid fuel and controlled flow of gaseous fuel, and disposed in fluid communication with an engine injection system, said circulation system providing the fuel mixture to the engine injection system and causing the fuel mixture to traverse a circulation path within which the gaseous fuel is infused into the liquid fuel thereby forming the fuel mixture; and
circulating the fuel mixture through the circulation path providing an infusion volume through which the fuel mixture traverses before being provided to the engine injection system, the infusion volume being at least a volume such that substantial homogeneity of the liquid-gaseous mixture is provided.

* * * * *